(12) United States Patent
Nakazuru et al.

(10) Patent No.: US 7,461,114 B2
(45) Date of Patent: Dec. 2, 2008

(54) FOURIER TRANSFORM APPARATUS

(75) Inventors: Toshiro Nakazuru, Kawasaki (JP); Shigeaki Okutani, Kawasaki (JP); Noboru Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 628 days.

(21) Appl. No.: 10/645,498

(22) Filed: Aug. 22, 2003

(65) Prior Publication Data
US 2004/0039765 A1   Feb. 26, 2004

Related U.S. Application Data

(63) Continuation of application No. PCT/JP01/01509, filed on Feb. 28, 2001.

(51) Int. Cl.
*G06F 15/00* (2006.01)

(52) U.S. Cl. .................................. 708/404; 708/405

(58) Field of Classification Search ............... 708/401, 708/403–406
See application file for complete search history.

(56) References Cited

U.S. PATENT DOCUMENTS

| | | | | |
|---|---|---|---|---|
| 4,768,159 A | * | 8/1988 | Gray et al. | 708/405 |
| 5,694,347 A | * | 12/1997 | Ireland | 708/404 |
| 5,831,883 A | * | 11/1998 | Suter et al. | 708/404 |

FOREIGN PATENT DOCUMENTS

| | | |
|---|---|---|
| JP | 59-87575 | 5/1984 |
| JP | 59-168578 | 9/1984 |
| JP | 63-36553 | 2/1988 |
| JP | 04-245562 | 9/1992 |
| JP | 4-245562 | 9/1992 |
| JP | 06-019955 | 1/1994 |
| JP | 09-034876 | 2/1997 |
| JP | 09-204406 | 8/1997 |

OTHER PUBLICATIONS

Nippon Hoso Kyokai, Hoso Gijutsu Kenkyusko ed., Digital Broadcast Technology Dictionary in the Multimedia Era, First Edition (Masujen Co., Ltd.), Jun. 10, 1994, pp. 300-301.
International Search Report.
International Preliminary Examination.

* cited by examiner

*Primary Examiner*—Chuong D Ngo
(74) *Attorney, Agent, or Firm*—Staas & Halsey LLP

(57) ABSTRACT

A Fourier transform apparatus whose pipeline width is independent of transform point number of individual pipeline FFT circuits in each stage and composed of a preceding stage and a succeeding stage. Each of the stages includes M(power of 2)-point radix 2 pipeline FFT circuits each having two-parallel inputs/outputs in a number of a (divisor of M) which are equal in respect to the transform point number and data permutating means for data supply to the transform means of each stage so that the pipeline width of the Fourier transform apparatus is made independent of the transform point numbers of the individual pipeline FFT circuits in each stage.

9 Claims, 13 Drawing Sheets

BASIC IMPLEMENTATION OF THE INVENTION

SIXTH READ ADDRESS GENERATING CIRCUIT (EXAMPLE FOR $a \geq 2$)

SIXTH READ ADDRESS GENERATING CIRCUIT (EXAMPLE OF $a=1$)

Fig. 16
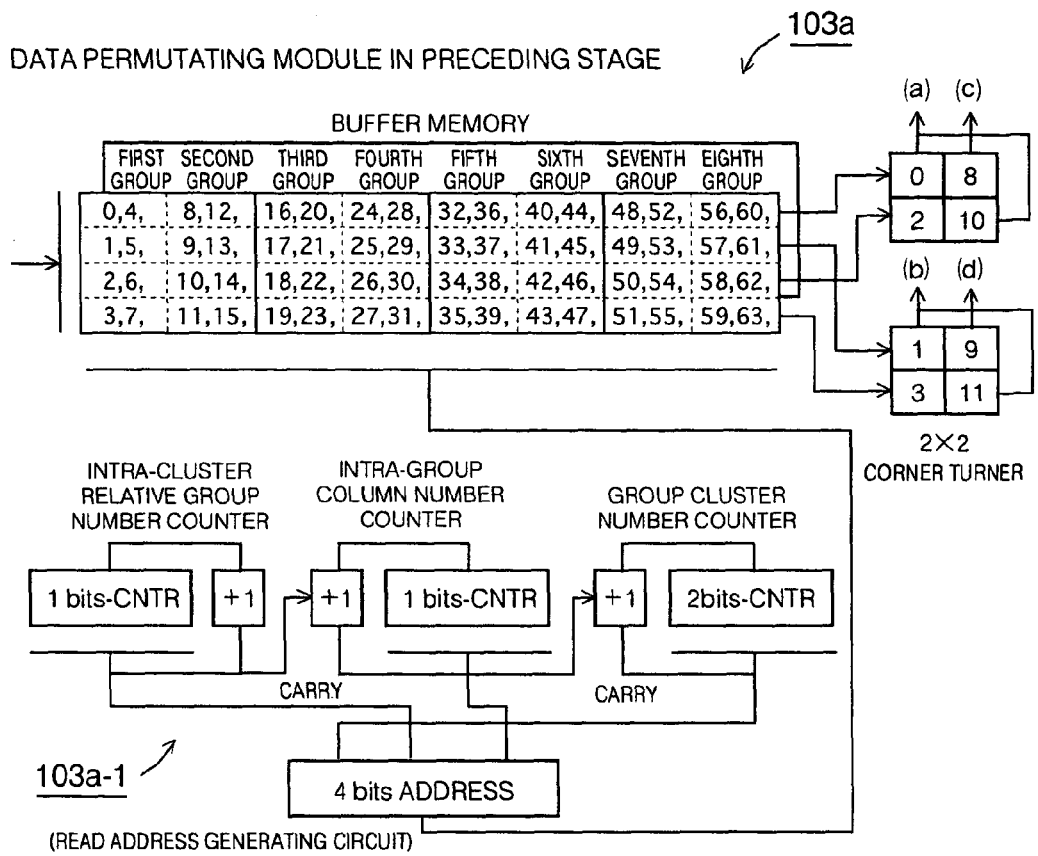
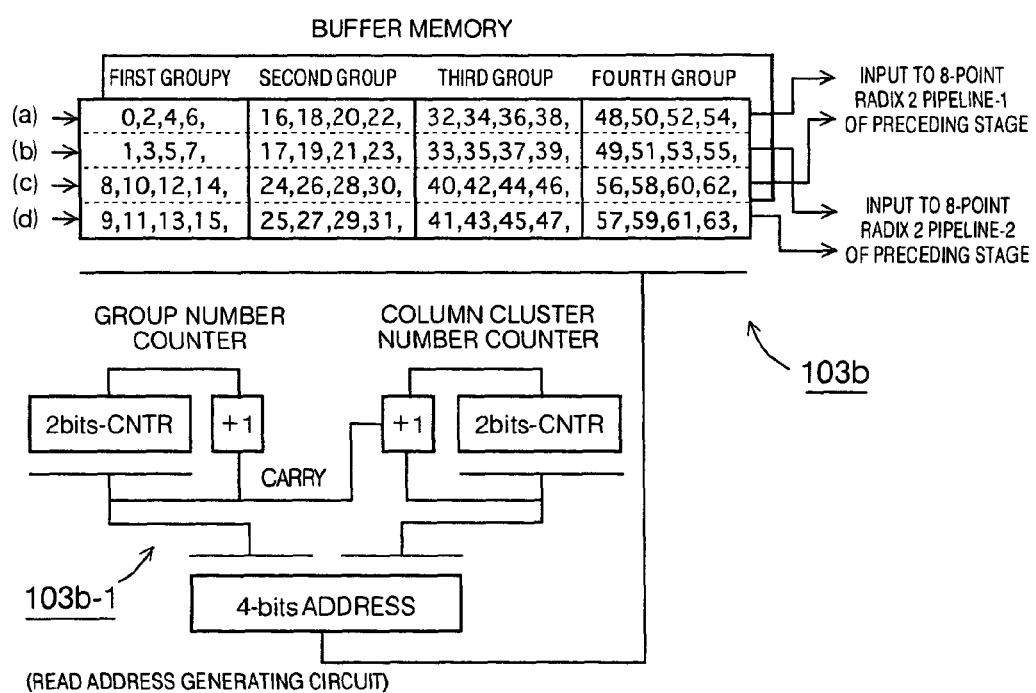

US 7,461,114 B2

FOURIER TRANSFORM APPARATUS

This application is a continuing application, filed under 35 U.S.C. §111(a), of International Application PCT/JP01/01509, filed Feb. 28, 2001.

TECHNICAL FIELD

The present invention relates to a Fourier transform apparatus capable of performing discrete Fourier transform at a high speed. More particularly, the present invention is concerned with a Fourier transform apparatus which is divided into two stages, i.e., a preceding stage and a succeeding stage, wherein a same number of radix 2 Fourier transform pipelines (radix 2 pipeline FFTs) are disposed.

BACKGROUND TECHNIQUES

The $M(2^m$: hereinafter written as 2**m)-point radix 2 pipeline FFT is known as an arithmetic pipeline implemented in m stages each including data permutation and arithmetic operation modules. For more particulars, reference may have to be made to "THEORY AND APPLICATION OF DIGITAL SIGNAL PROCESSING" by Lawrence R. Rabiner, Bernard Gold, published by PRENTICE HALL, 1975, Article "Radix 2 Pipeline FFT", p. 604.

In the case where the number of data undergoing Fourier transform (hereinafter also referred to as the transform point number) can be decomposed such that N=L×M, then L-point FFT operation is performed M times in accordance with the principle of the FFT, and after twiddle factor multiplication performed for N data obtained, M-point FFT (fast Fourier transform) operation is performed L times, whereby Fourier transform can be accomplished. There have been proposed several methods of implementing the pipelines by decomposing the N-point Fourier transform.

According to one of the methods, in the case where the transform point number N can be expressed as N=L×L, L-point parallel type Fourier transform circuit (whose inputs/outputs are equal to the transform point number L) is disposed in each of the preceding stage and the succeeding stage, wherein a data permutating circuit termed the corner turner is disposed in precedence to each of the L-point parallel type Fourier transform circuits for data supply thereto.

Further, in the case where the transform point number N is given by N=L×M (L=P×M, where P is an integer greater than one), similar arrangement may be adopted. In any case, width of parallelism (or parallelism width) is given by L.

Parenthetically, the corner turner is a circuit designed to output two-dimensional data after effecting the transposition thereof by regarding the two-dimensional data as a matrix (refer to Japanese Patent Application Laid-Open No. 59-087575).

In addition, according to another method, a number A of (2m)-point radix 2 pipeline FFT circuits each having two-parallel input/outputs are disposed in parallel in the preceding stage in the case where the transform point number N is given by N=(2m)×A, while in the succeeding stage, a pair of A-point parallel type Fourier transform circuits (having a pipeline width A) are disposed in parallel with each other. In that case, the overall parallelism width is given by 2×A.

In the Fourier transform apparatuses described above, with the structurization scheme that the parallel type Fourier transform circuits are disposed in the preceding stage and the succeeding stage, respectively, the input parallel point number or the pipeline width assumes a value greater than or equal to the square root of the Fourier transform point number, which means that the pipeline width smaller than the square root of the transform point number N can not be obtained, to a disadvantage (refer to Patent Publication No. 63-36553).

With another structurization scheme according to which a plurality of radix 2 pipeline FFT circuits each having two parallel input/outputs are disposed in parallel in the preceding stage with a pair of parallel type Fourier transform apparatus being disposed in the succeeding stage, the input parallel point number or the pipeline width can be determined with less dependency on the Fourier transform point number. However, since the input parallelism or the transform point number of the parallel type Fourier transform circuits in the succeeding stage is equal to the number A of the radix 2 pipeline FFTs each of two parallel input/outputs disposed in the preceding stage (i.e., a half of the pipeline width of the apparatus), implementation of the apparatus will encounter difficulty due to the spatial parallelity of the parallel type Fourier transform circuits in the succeeding stage, giving rise to a problem (refer to Japanese Patent Application Laid-Open No. 4-245562).

In the light of the state of art, it is an object of the present invention to provide a Fourier transform apparatus whose pipeline width has substantially no dependency on the transform point numbers of the individual pipeline FFT circuits in each stage.

DISCLOSURE OF THE INVENTION

With a view to solving the problem described above, the present invention provides a Fourier transform apparatus for performing discrete Fourier transform, which features a transform means of a preceding stage including a number a of M-point radix 2 pipeline FFT circuits each having two parallel inputs/outputs, wherein M(=2m, m>=2) represents a maximum number of points for transform and a represents a divisor of the maximum transform point number M, a first data supply means for supplying input data to the transform means of the preceding stage in accordance with a first predetermined order, a transform means of a succeeding stage including a same number of M-point radix 2 pipeline FFT circuits as the transform means of the preceding stage, each of the FFT circuits having two parallel inputs/outputs, a second data supply means for supplying input data to the transform means of the succeeding stage in accordance with a second predetermined order, and a twiddle factor multiplication means including 2a complex multiplication circuits and storage means for storing twiddle factors, provided between the transform means of the preceding stage and the transform means of the succeeding stage for multiplication of twiddle factor. An exemplary embodiment of the apparatus described above is shown in FIG. 1**.

Further, the Fourier transform apparatus according to the present invention features that the first data supply means includes a first memory circuit implemented in a two-bank structure, a writing means for writing alternately and sequentially the input data on an M-by-M basis while changing over banks of the first memory circuit, and a reading means for reading out simultaneously the data from corresponding positions of the two banks of the first memory circuit for supplying the data to the transform means of the preceding stage. An exemplary embodiment of the apparatus described above is shown in FIG. 2.

Further, the Fourier transform apparatus according to the present invention features that the first data supply means is comprised of first and second data permutating modules in two stages for permutating the data in a predetermined order, said first and second data permutating modules being composed of second and third memory circuits for storing data, a read or write address generating circuit conforming to predetermined logics of the second and third memory circuits, respectively, and corner turners for permutating data read out from the second and third memory circuits, respectively, and that the second data supply means is comprised of a third data permutating module, said third data permutating module being composed of a fourth memory circuit for storing data, a read or write address generating circuit conforming to a predetermined logic of the fourth memory circuit and corner turners for permutating data read out from the fourth memory circuit. An exemplary embodiment of the apparatus described above is shown in FIGS. 4 and 5.

Further, the Fourier transform apparatus according to the present invention features that in the case where the number a of the pipeline FFT circuits incorporated in the transform means of the preceding stage and the succeeding stage is two, the first data supply means is comprised of fourth and fifth data permutating modules in two stages, said fourth and fifth data permutating modules being composed of fifth and sixth memory circuits for storing data, respectively, read or write address generating circuits conforming to predetermined logics of the fifth and sixth memory circuits, respectively, and corner turners for permutating data read out from the fifth memory circuit, and that the second data supply means is comprised of a sixth data permutating module, said sixth data permutating module being composed of a seventh memory circuit for storing data, a read or write address generating circuit conforming to a predetermined logic of the seventh memory circuit. The apparatus described above corresponds, for example, to those shown in FIGS. 4 and 5 from which the corner turner 324 is omitted.

Further, the Fourier transform apparatus according to the present invention features that in the case where the number a of the pipeline FFT circuits incorporated in the transform means of the preceding stage and the succeeding stage is one, the first data supply means is comprised of seventh and eighth data permutating modules, wherein the seventh data permutating module is composed of an eighth memory circuit for storing data, a read or write address generating circuit which conforms to a predetermined logic of the eighth memory circuit and a parallel-in serial-out circuit for permutating the data read out from the eighth memory circuit, while the eighth data permutating module includes a ninth memory circuit constituted by two banks so that upon data storing, data are written in the two banks alternately M by M data whereas upon data reading, corresponding data of corresponding data sets each of M point data are simultaneously read out from the two banks, respectively, to constitute two parallel imputs of said pipeline FFT circuits and a read or write address generating circuit which operates in conformance to a predetermined logic of the ninth memory circuit, and that the second data supply means is comprised of a tenth memory circuit constituted by two banks so that upon data storing, data are written in the two banks alternately on an M-by-M basis whereas upon data reading, corresponding data of corresponding data sets each of M point data are simultaneously read out from the two banks, respectively, to constitute two parallel inputs of said pipeline FFT circuits and a read or write address generating circuit which operates in conformance to a predetermined logic of the tenth memory circuit. An exemplary embodiment of the apparatus described above is shown in FIGS. 8 and 9.

Further, the Fourier transform apparatus according to the present invention features that the Fourier transform apparatuses described above are disposed in parallel in a number equal to a power of "2", time-serial input data are allocated to the Fourier transform apparatuses, respectively, on an N-by-N basis, where N (=M×M) represents a maximum number of points for Fourier transform, and that the Fourier transform apparatus includes a data distributing/permutating means for supplying sets of contiguous M point data on an a-by-a basis in parallel on a two-by-two data basis in each set and hence in parallel on a 2a-by-2a data basis in total to the Fourier transform apparatuses, respectively. This apparatus is described in the section (parallel disposition) in the description of the preferred mode for carrying out the invention.

Further, the Fourier transform apparatus according to the present invention features that the data distributing/permutating means mentioned above is composed of an eleventh memory circuit for storing data corresponding to the number of Fourier transform apparatuses disposed in parallel, a read or write address generating circuit which conforms to a predetermined logic of the eleventh memory circuit and corner turners for permutating data read out from the eleventh memory circuit to output the data in parallel to the Fourier transform apparatuses, respectively, which are disposed in parallel. An exemplary embodiment of the apparatus described above is shown in FIG. 12.

Further, the Fourier transform apparatus according to the present invention features that the Fourier transform apparatus includes a bypass means for bypassing arithmetic operation performed by the transform means of the preceding stage and the succeeding stage. This apparatus is described in conjunction with the bypass processing in the description of the preferred mode for carrying out the invention.

Further, according to the present invention, the Fourier transform for M×M points is performed by dividing the apparatus into two stages, i.e., preceding stage and succeeding stage and disposing a same number of M-point radix 2 pipeline FFT circuits each having two parallel inputs/outputs (with pipeline width of "2") in each stage. The overall pipeline width is adjusted by the number a of the pipeline FFT circuits disposed in parallel. On the assumption that M=2**m and that the number a is a divisor of M, the M-point Fourier transform are shared by the individual pipeline FFT circuits on a (M/a)-sets basis, respectively, whereby the control such as data distribution, etc. can be facilitated.

The pipeline width of each radix 2 pipeline FFT circuit having two parallel inputs/outputs is "2" at the most. Thus, the intricacy of the signals in the radix 2 pipeline FFT circuit is mitigated, presenting substantially no problem in the implementation. However, to this end, it is required to provide the data permutating means in each stage as the data supplying means.

Parenthetically, the pipeline stages of the M-point radix 2 pipeline FFT circuits each having two parallel inputs/outputs can be so arranged as to bypass only the arithmetic operation sequentially from the leading stage, whereby the Fourier transform point number can be reduced half by half. Thus, with the same apparatus configuration, transform of M×M, (M/2)×M, . . . , 2×M points can be realized by changing the mode setting or the like.

BRIEF DESCRIPTION OF THE DRAWINGS

FIG. 16 is a block diagram showing a data permutating module in the preceding stage of the 64-point FFT.

BEST MODES FOR CARRYING OUT THE INVENTION

Figure 1:
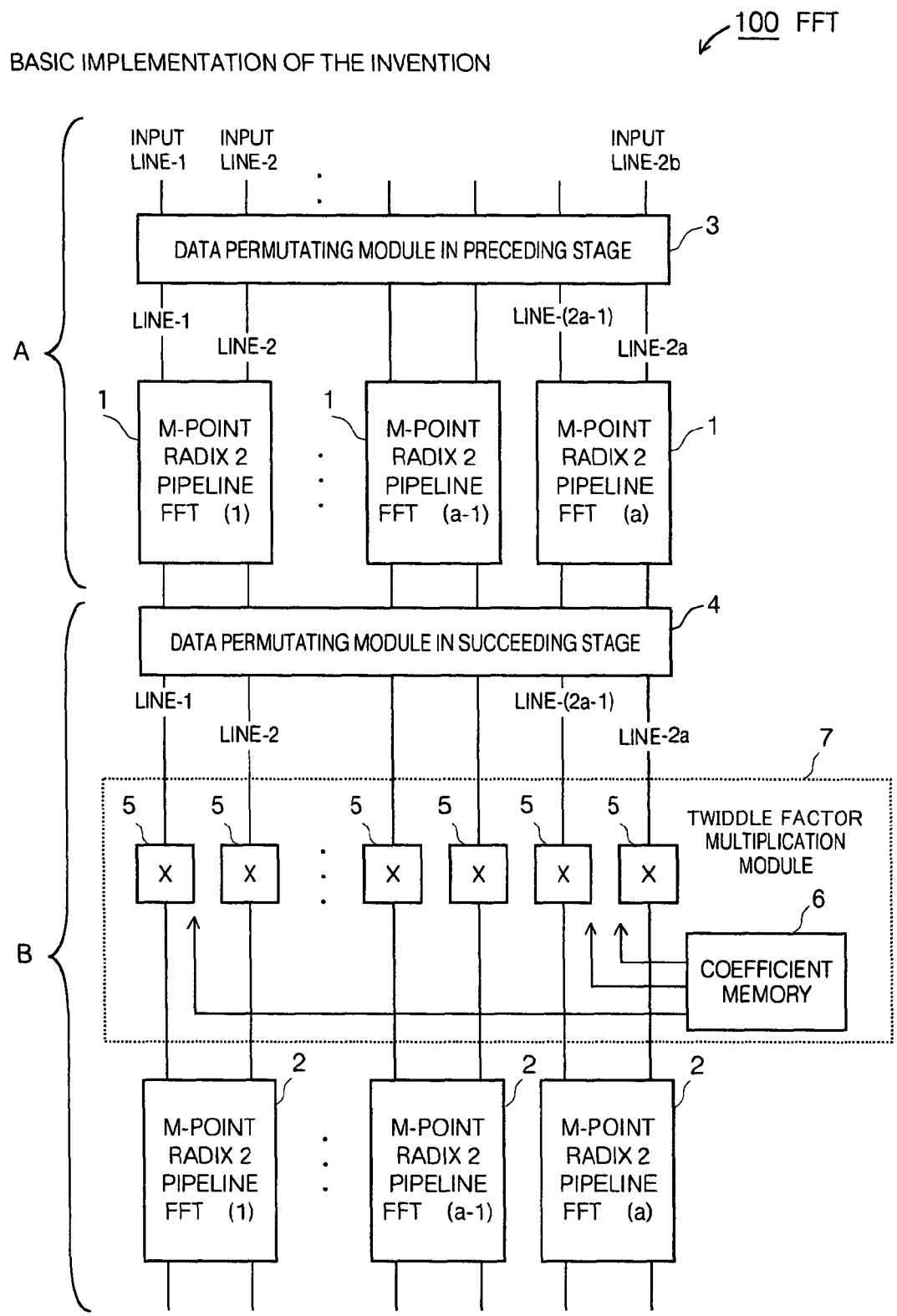
FIG. 1 is a block diagram showing a Fourier transform apparatus according to the present invention.

FIG. 1 is a block diagram showing a basic structure of the Fourier transform apparatus according to an embodiment of the present invention (i.e., a mode for carrying out the invention). An FFT 100 shown in FIG. 1 is implemented in two stages, i.e., a preceding stage A and a succeeding stage B, wherein as the transform circuits of the preceding stage, there are provided a number a of M-point radix 2 pipeline FFT circuits 1 each having two parallel inputs/outputs together with a data permutating module 3 which is designed to serve as a first data supply means for supplying data to the pipeline FFT circuits 1. On the other hand, as the transform circuits of the succeeding stage, there are provided a number a̲ of M-point radix 2 pipeline FFT circuits 2 each having two parallel inputs/outputs, a data permutating module 4 serving as a second data supply means for supplying data to the pipeline FFT circuits 2, a twiddle factor multiplication module 7 which is disposed immediately following the data permutating module 4 and which includes 2a complex multiplication circuits 5 for multiplication of twiddle factors and a coefficient memory 6 for storing the twiddle factors. In this conjunction, it should be added that the twiddle factor multiplication module 7 may be provided immediately before the data permutating module 4 of the succeeding stage by altering or modifying appropriately the sequence or order in which the twiddle factors are supplied.

(Data Permutating Method 1 in the Preceding Stage)

Figure 2:
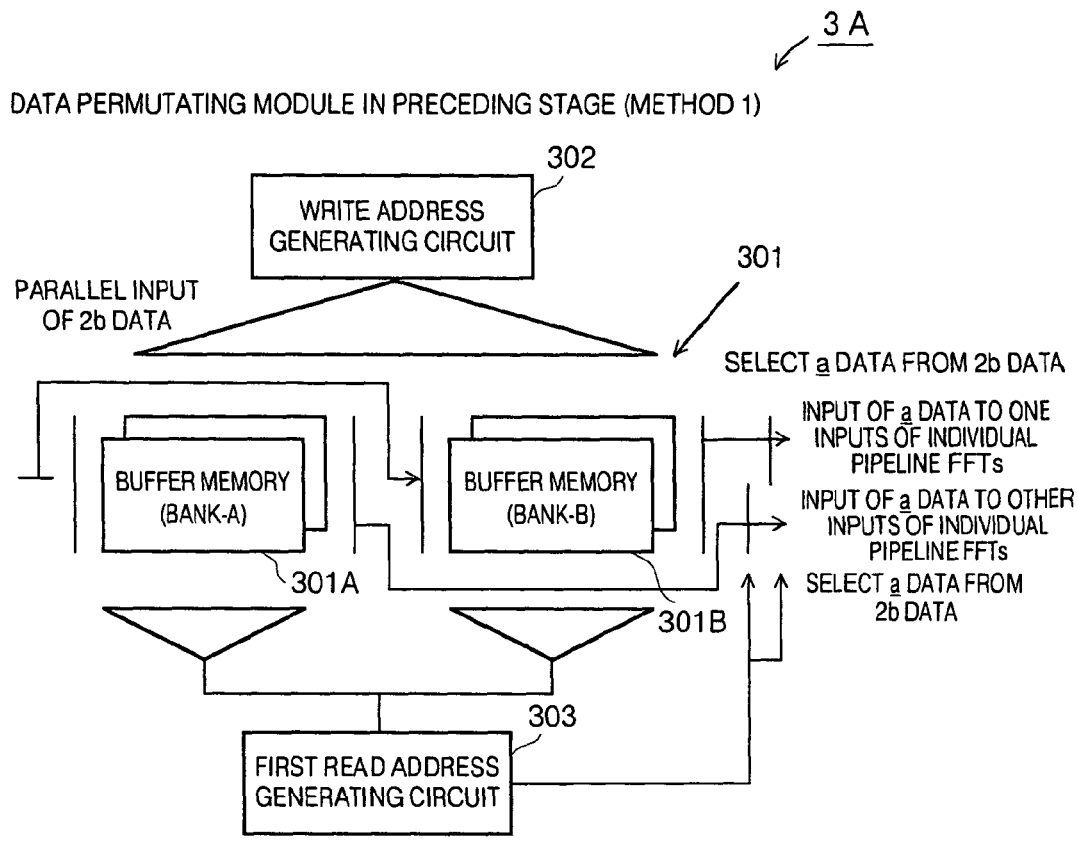
FIG. 2 is a block diagram showing a first exemplary embodiment of a data permutating module in a preceding stage.

FIG. 2 is a block diagram illustrating a first exemplary embodiment (method 1) of the data permutating module of the preceding stage which serves as the data supply means in the preceding stage. In the data permutating module 3A shown in FIG. 2, a buffer memory 301 is implemented in a double buffering structure for enabling simultaneously write and read accesses and realized in a two-bank structure including banks 301A and 301B so that data groups belonging to two different sets can be simultaneously read out in the read-out operation. Incidentally, in the description which follows, the term "buffer memory" or simply "memory" means the double buffer memory. The input data are sequentially written in the banks by changing over the banks on an M-by-M data basis by means of a write address generating circuit 302. On the other hand, in the data read-out operation, data are simultaneously read out from corresponding locations of the two banks by means of a first read address generating circuit 303, whereby every M-th data can be obtained pairwise or on a two-by-two basis, i.e., two data can be obtained in parallel with M data apart.

(Data Permutating Method 2 in the Preceding Stage)

Figure 4:
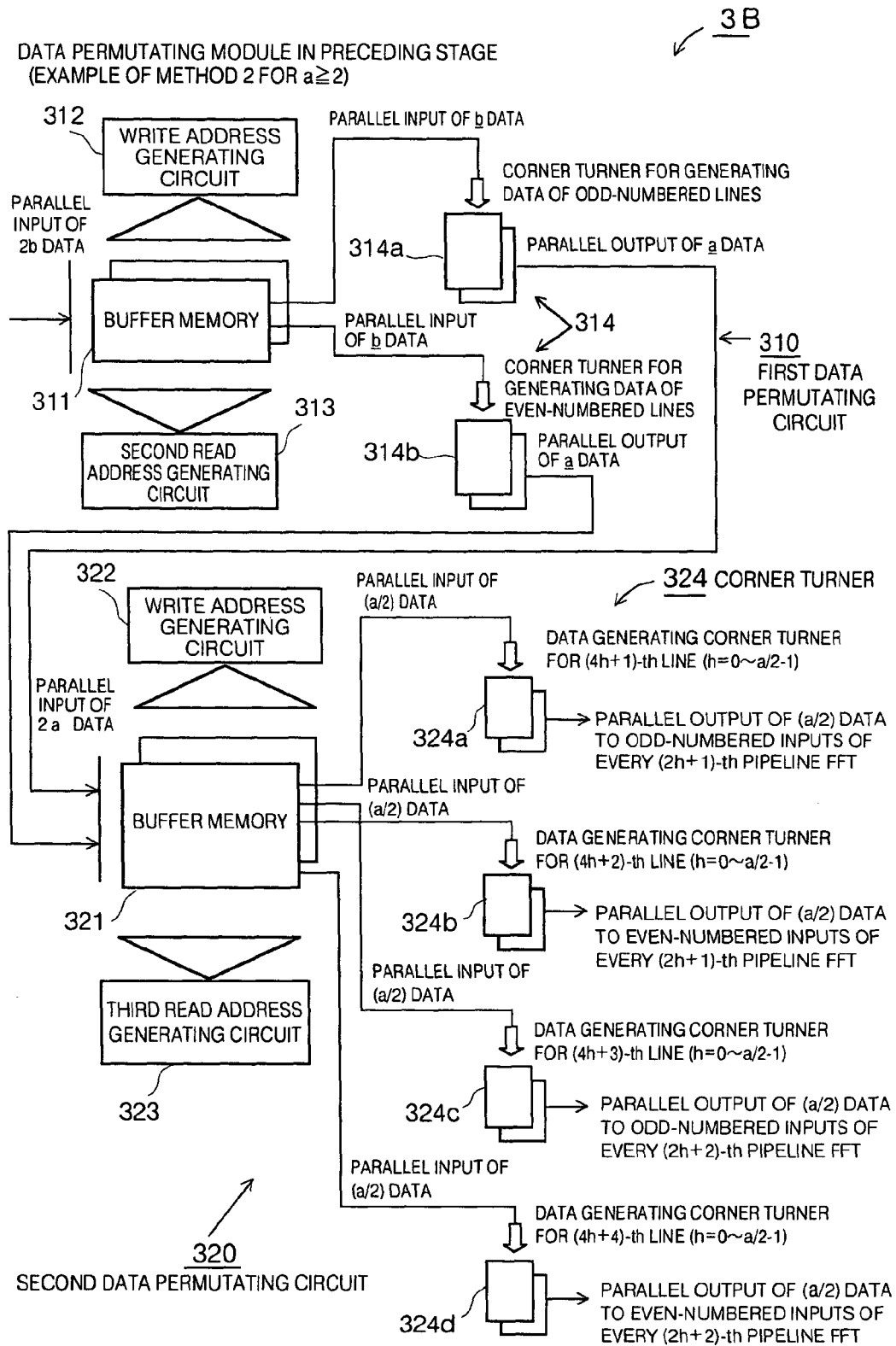
FIG. 4 is a block diagram showing a data permutating module in the preceding stage in the case where a̲ is not smaller than "2".
Figure 8:
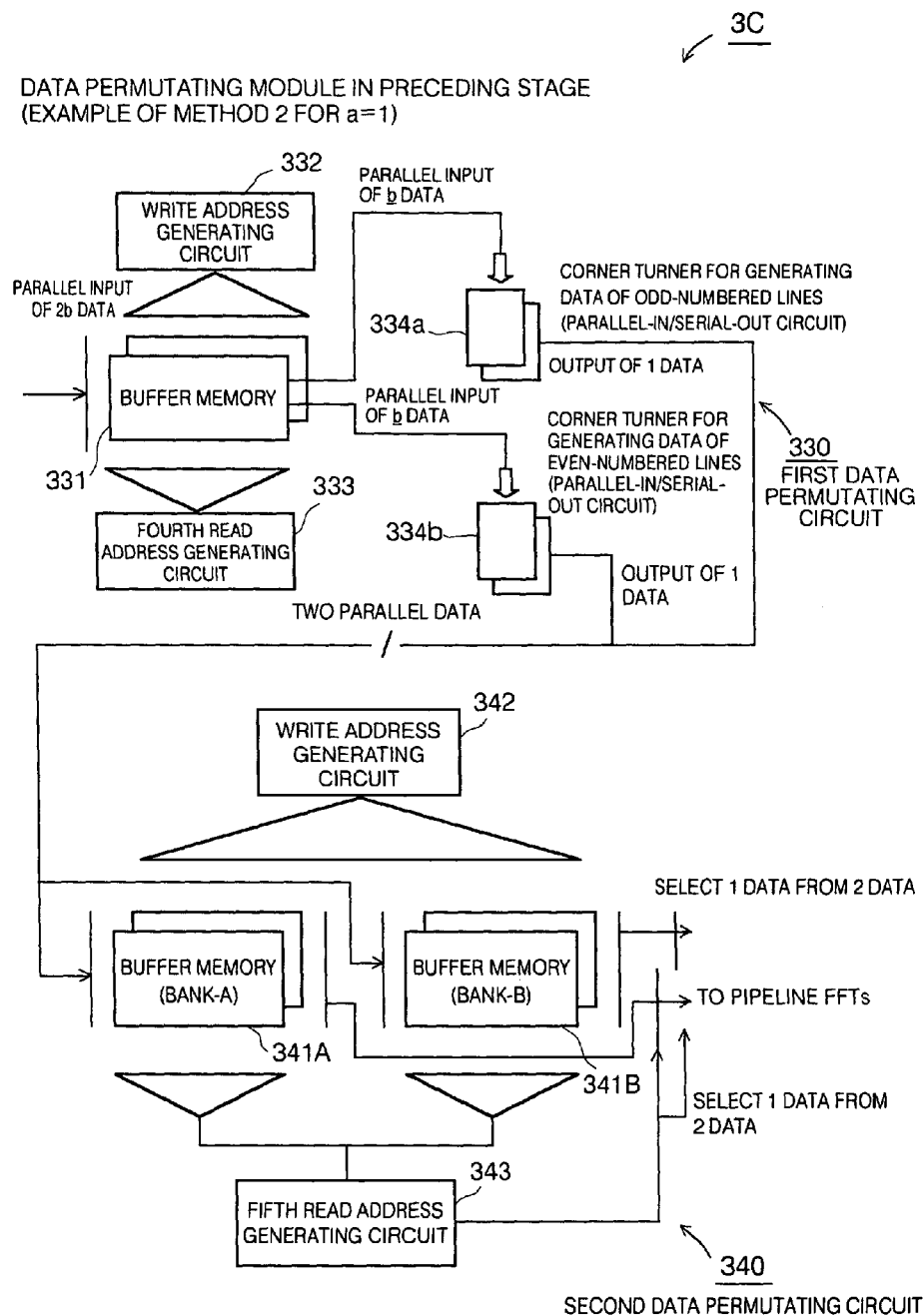
FIG. 8 is a block diagram showing a data permutating module in the preceding stage in the case where a̲ is "1".

FIGS. 4 and 8 are block diagrams showing a second exemplary embodiment (method 2) of the data permutating module serving as the data supply means in the preceding stage, wherein FIG. 4 shows a preferred exemplary embodiment in the case where a̲ is not smaller than "2" while FIG. 8 shows a preferred exemplary embodiment in the case where a̲ is equal to "1". Each of the data permutating module 3B; 3C of the preceding stage shown in FIGS. 4 and 8, respectively, is implemented in a two-stage structure including a first half part and a second half part. In the first half part, data trains are first generated each on an M-by-M data basis from the time-serial parallel data by a first data permutating circuit 310; 330 in correspondence to M-point radix 2 pipeline FFT circuits each having two parallel inputs/outputs, respectively, i.e., in a column of a̲ (i.e., two columns in each set of M data), whereon data permutation is so performed by means of the second data permutating circuit 320; 340 of the second half part that data is fetched one by one from blocks aligned in a column of a̲ on an M-by-M data basis as generated in the first half part, whereby M data sets are obtained for every M-th data in terms of time-serial data.

(Data Permutating Method 2 in the Preceding Stage in the Case where a≧2)

Firstly, in the case where a≧2, i.e., when the number of the pipeline FFTs in each stage is not smaller than two, the first data permutating circuit 310 constituting the first half part of the data permutating module 3B of the preceding stage is composed of a memory and corner turners, as shown in FIG. 4, wherein the memory includes a buffer memory 311 serving as a storage means having an input/output width of the data number which corresponds to the input data width, a write address generating circuit 312 and a second read address generating circuit 313. The corner turners 314 are constituted by a pair of corner turners 314a and 314b in correspondence to the odd-numbered input data and the even-numbered input data, respectively.

The second data permutating circuit 320 constituting the second half part of the data permutating module 3B of the preceding stage is comprised of a memory and corner turners similarly to the first data permutating circuit 310 of the first half part, wherein the memory includes a buffer memory 321 serving as the storage means having the input/output width of the data number corresponding to the pipeline width of the transform module, a write address generating circuit 322 and a third read address generating circuit 323, while the corner turners 324 include four sets of corner turners 324a, 324b, 324c and 324d into which data group outputted every third line counted from the leading one in the output line array of the memory, data group outputted every third line counted from the third line, data group outputted every third line counted from the second line and data group outputted every third line counted from the fourth line are inputted, respectively, for the data permutation.

In particular, in the case where a=2, only one data is inputted to the corner turner, which renders any operation unnecessary. Thus, the circuit for the corner turner is unnecessary. Mere routing of the data from the memory is sufficient.

(Data Permutating Method 2 in the Preceding Stage in the Case where a=1)

In the case where a=1, i.e., when the number of the pipeline FFT in each stage is one, the first data permutating circuit 330 of the first half part in the data permutating module 3C is composed of a memory and corner turners, as shown in FIG. 8, wherein the memory includes a buffer memory 331 serving as a storage means having an input/output width of the data number which corresponds to the input data width, a write address generating circuit 332 and a fourth read address generating circuit 333. The corner turners are comprised of a pair of parallel-in/seerial-out circuits 334a and 334b in correspondence to the odd-numbered input data and the even-numbered input data, respectively.

The second data permutating circuit 340 of the second half part is composed of a buffer memory of a two-bank configuration including memory banks 341A and 341B so that two different data groups can simultaneously be read out in the read operation and provided with a write address generating circuit 342 and a fifth read address generating circuit 343, respectively. The second data permutating circuit 340 is simplified when compared with the second data permutating circuit shown in FIG. 2 where b=1 and a=1.

(Data Permutating Method in the Succeeding Stage)

Figure 5:
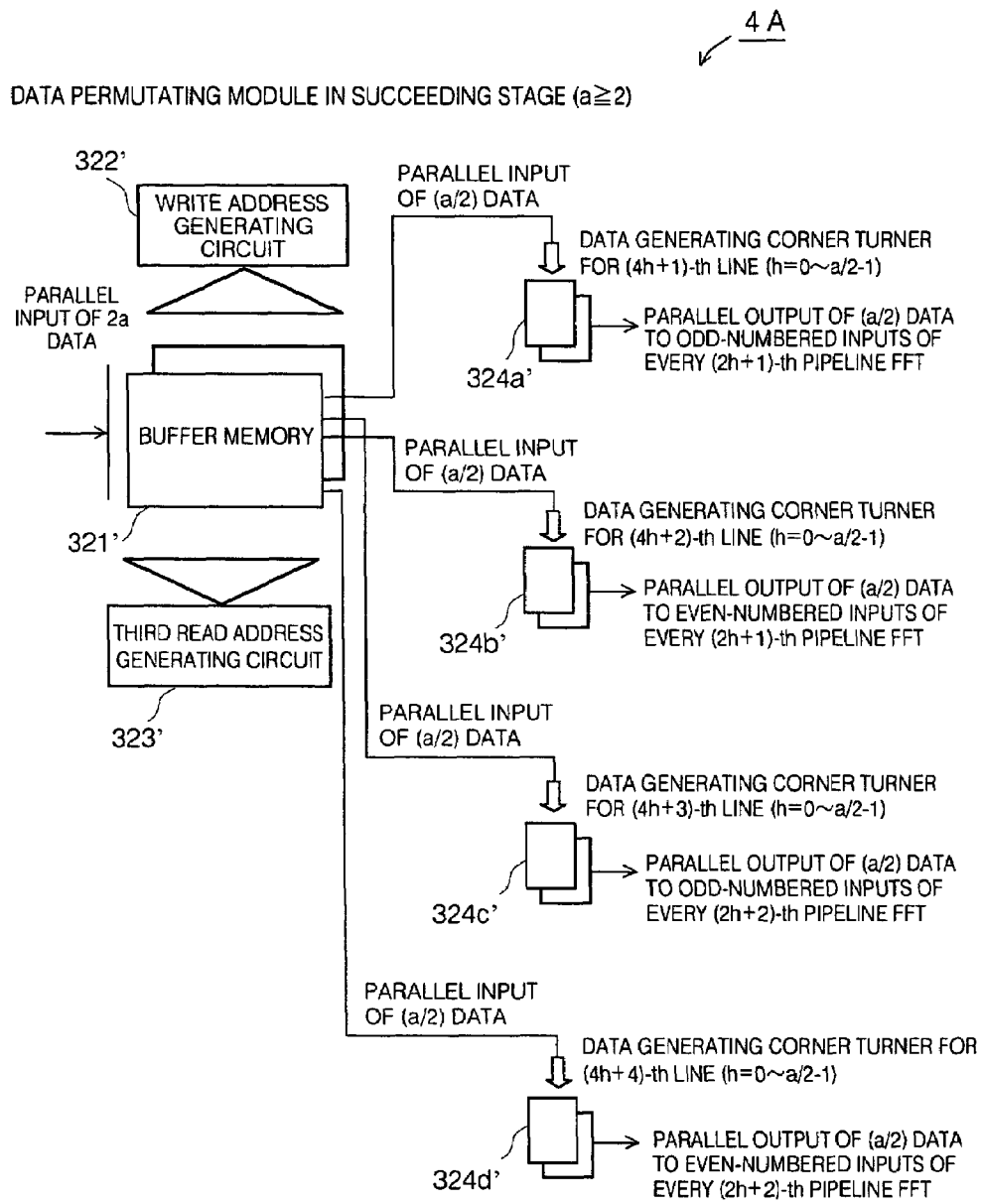
FIG. 5 is a block diagram showing a data permutating module in the succeeding stage in the case where a̲ is not smaller than "2".
Figure 9:
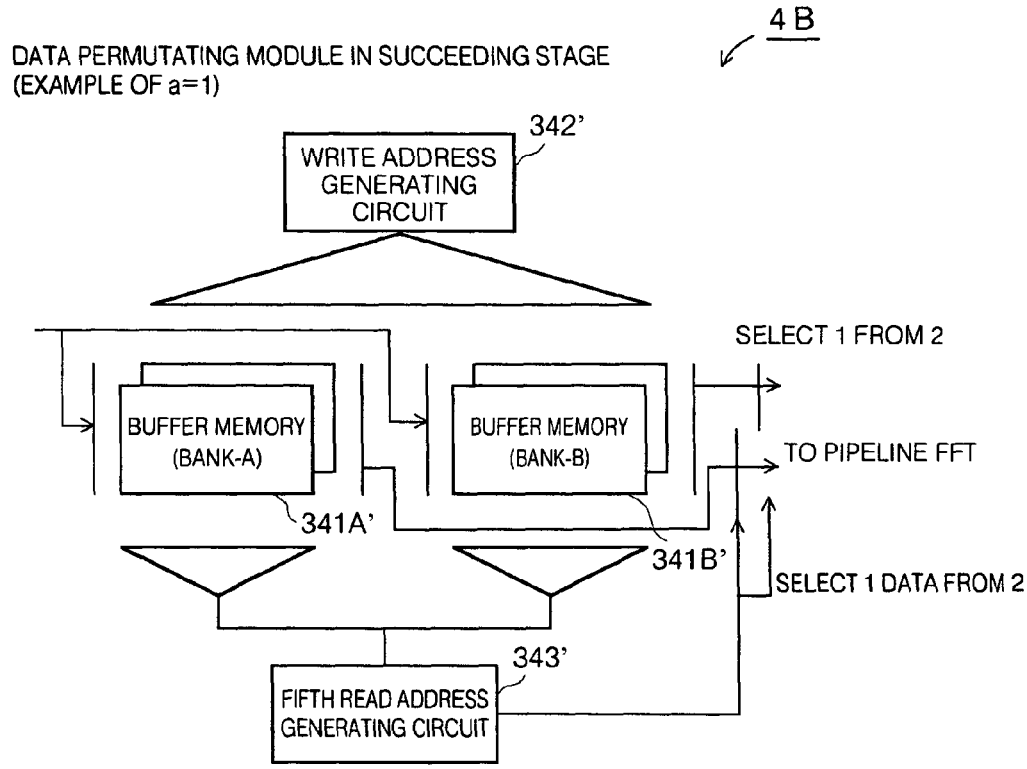
FIG. 9 is a block diagram showing a data permutating module in the succeeding stage in the case where a̲ is "1".

The data permutating module 4 of the succeeding stage shown in FIG. 1 is implemented in such a structure as shown in FIG. 5 in the case where a≧2, while it is implemented in a structure shown in FIG. 9 in the case where a=1. More specifically, the data permutating modules 4A and 4B of the succeeding stage shown in FIGS. 5 and 9 are of the same structure as the second data permutating circuit (second half part) shown in FIGS. 4 and 8, respectively. Accordingly, repeated description of these data permutating modules of the succeeding stage will be unnecessary. It should however be added that they are so arranged that M data sets can be obtained by fetching every M-th one from the output data of the preceding stage FFTs.

(Description of Operation)

Next, description will be made of the Fourier transform apparatus according to the instant embodiment of the invention.

At first, description will be made on the presumption that the transform point number (i.e., number of data undergoing the transform) of the a individual radix 2 pipeline FFT circuits each having two parallel inputs/outputs which constitute the transform means of the preceding stage is maximum, i.e., equal to the transform point number of the a individual pipeline FFT circuits of the succeeding stage, which is finally followed by the description for elucidating that the same apparatus configuration can be adopted even in the case where the transform point number of the preceding stage is smaller than M, i.e., $2^{**}p$ (where p=1~m-1).

In N-point discrete Fourier transform, $$X(n) = \Sigma \times (k) \times W^{**}(n \times k) \quad (°)$$

where $W = \exp(-2\pi j/N)$, and
n, k=0~N-1.

Assuming that the transform point number N can be decomposed such that N=M×M (where M=$2^{**}$m) and representing indexes as follows:

$$n = M \times n1 + n0, \text{ and}$$

$$k = M \times k1 + k0$$

where n1, n0=0~M-1, and
k1, k0=0~M-1,
then, the discrete Fourier transform equation (0) can be rewritten as follows:

$$X(n1, n0) = \sum_{k0=0}^{M-1} \sum_{k1=0}^{M-1} \times (k1, k0) \times WM^{**}(n0 \times k1)$$

$$\times W^{}(n0 \times k0) \times WM^{}(n1 \times k0)$$

where WM=exp(-2πj/M) and thus can be decomposed into undermentioned steps:

$$X1(n0, k0) = \Sigma \times (k1, k0) \times WM^{**}(n0 \times k1) \quad (1)$$

$$k1 = 0 \sim M-1$$

$$X2(n0, k0) = X1(n0, k0) \times W^{**}(n0 \times k0) \quad (2)$$

$$X3(n0, n0) = \Sigma X2(n0, k0) \times WM^{**}(n1 \times k0) \quad (3)$$

$$k0 = 0 \sim M-1$$

It can be seen that the equation (1) for which k0 is fixed represents M-point DFT equation, which in turn means that the processing can be executed by the M-point radix 2 pipeline FFT circuits. Since k0=0~M-1, M sets of different DFTs are carried out, which can consecutively be executed without being accompanied with any interruption by employing a number a of M-point radix 2 pipeline FFT circuits on the presumption that a is a divisor of M.

The equation (2) can be realized by multiplying the individual outputs resulting from the processing in accordance with the equation (1) by twiddle factor, respectively. This multiplication processing can be carried out by a group of the twiddle factor multiplication circuits disposed in parallel in a number 2a without interruption. The equation (3) for which n0 is fixed represents M-point DFT equation, which means that the processing can be executed by the M-point radix 2 pipeline FFT circuits. Since n0=0~M-1, M sets of different DFTs are carried out, which can consecutively be executed without interruption by employing a number a of M-point radix 2 pipeline FFT circuits, similarly to the case of the equation (1), on the presumption that a is a divisor of M.

In particular, since k=M×k1+k0, the equation (1) indicates that it is necessary to fetch every M-th data from those inputted serially and supply them to the pipelines on the conditions that k0 is fixed to a given value and that the value of k1 varies in a range of "0" to "M-1". This operation is performed by the data permutating circuit of the preceding stage.

Further, in the equation (3), the index of X2 is given by M×n0+k0. Accordingly, the indexes must assume contiguous values on the presumption that n0 is fixed to a given value while the value of k0 varies in a range of "0" to "M-1". Furthermore, the indexes make appearance upon every M-th data in the output of the preceding stage. Thus, it is required to rearrange or permutate the outputs as acquired such that the output data are made contiguous for the indexes before being supplied to the pipelines. In other words, it is necessary to fetch every M-th data from the data array outputted from the preceding stage and supply them to the pipelines. This operation is carried out by the data permutating module of the succeeding stage.

In the following, description will be directed to the data permutation processing executed by the data permutating module of the preceding and succeeding stages, respectively. On the presumption that the time-serial data {x(t): t=0~2**m−1} are inputted in parallel generally on a 2b-by-2b basis, contiguous data of the individual input data lines are grouped to sets on a B-by-B data basis. By putting together these sets transversely of the individual input data lines, they can be divided into M groups each including M-point data, as is shown in the table 1 mentioned below.

TABLE 1

| First group | Second group ... | (a + 1)-th group ... | M-th group |
|---|---|---|---|
| Input data line 1; | | | |
| {x(2bj)}, j = 0~B − 1 | {x(M + 2bj)}, j = 0~B − 1 | {x(aM + 2bj)} j = ~B − 1 | {x((M − 1)M + 2bj)} j = 0~B − 1 |
| Input data line 2; | | | |
| {x(2bj + 1)}, j = 0~B − 1 | {x(M + 2bj + 1)}, j = 0~B − 1 | {x(aM + 2bj + 1)}, j = 0~B − 1 | {x((M − 1)M + 2bj + 1)} j = 0~B − 1 |
| Input data line 3; | | | |
| {x(2bj + 2)}, j = 0~B − 1 | {x(M + 2bj + 2)}, j = 0~B − 1 | {x(aM + 2bj + 2)}, j = 0~B − 1 | {x((M − 1)M + 2bj + 2)} j = 0~B − 1 |
| ... | | | |
| Input data line 2b; | | | |
| {x(2bj + 2b − 1)}, j = 0~B − 1 | {x(M + 2bj + 2b − 1)}, j = 0~B − 1 | {x(aM + 2bj + 2b − 1)}, j = 0~B − 1 | {x((M − 1)M + 2bj + 2b − 1)} j = 0~B − 1 |

In the above table, the first input data line, . . . , the 2b-th input data line are shown orderly from the top. In the table, B=M/2b represents the input count number up to the M point data with the parallelism being of 2b, 2b represents the parallelism of the inputs, $\underline{b}$ represents a power of "2" because M must be aliquot, and a represents the numbers of the individual pipeline FFT circuits in the preceding and succeeding stages, respectively, and thus a is a divisor of M, also a power of "2".

Concerning the preceding stage data permutating module, a method carried out in one step (method 1) and a method executed in two steps (method 2) among others will be elucidated below. Incidentally, the latter half of the method carried out in two steps is implemented with the same structure as that of the succeeding stage.

(Permutating Method 1 in Preceding Stage)

Since each group mentioned above is a data set including M point data contiguous time-serially, the permutating method in the preceding stage resides in collecting the data at the corresponding locations in M groups one by one to acquire a data set including M data apart by M points time-serially. However, because each pipeline FFT has two parallel inputs, it is to read the data simultaneously from two data groups. For enabling the simultaneous access, the memory is divided into banks so that odd-numbered data group and even-numbered data group can be stored in the different bank memories, respectively.

From the individual banks, data are read out $\underline{a}$ by $\underline{a}$ sequentially, starting from the leading one, whereon two data stored in the two banks at the corresponding locations are supplied to one pipeline FFT as two parallel inputs. Ordinarily, 2b≧2a applies valid. At this juncture, let's represent 2b/a by $\underline{c}$ (where $\underline{c}$ is a power of "2"). Since the number of data required simultaneously is $\underline{a}$ of 2b column data in each group, each column in each group is read $\underline{c}$ times with remainder being discarded. (Incidentally, in the case where 2b<2a, the input data may be demultiplexed so as to be handled in the same manner as the case where 2b=2a.)

The data permutating module 3A of the preceding stage shown in FIG. 2 in conjunction with the method 1 is so arranged that the data inputted in parallel on a 2b-by-2b data basis are stored 2b by 2b in one of the banks 301A and 301B of the double buffer memory by changing over alternately the banks every time the number of data attains M while 2b data are read out simultaneously from two banks of the other memory with $\underline{a}$ data required from the 2b data being sent out.

Figure 3:
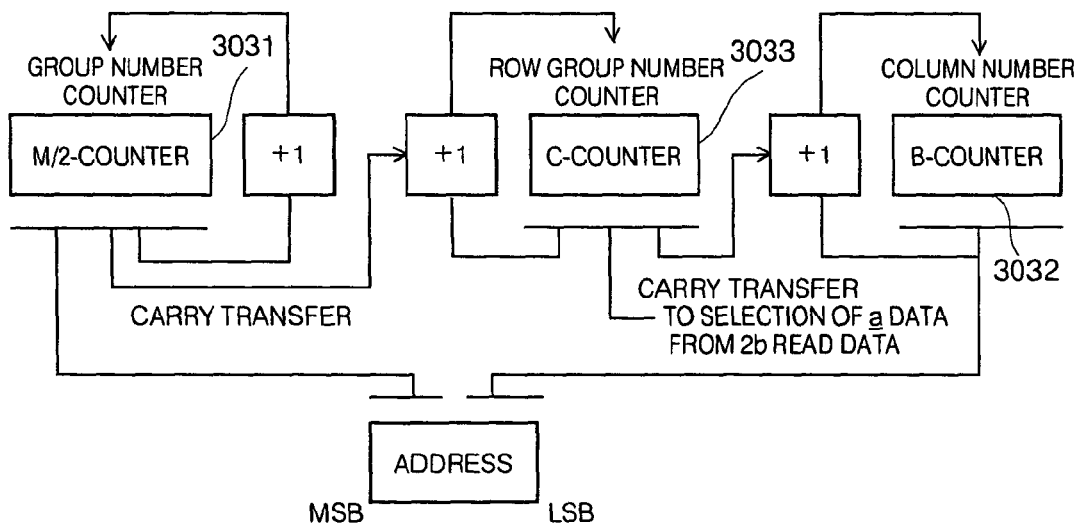
FIG. 3 is a block diagram showing an exemplary embodiment of a first read address generating circuit.

FIG. 3 is a block diagram showing an exemplary structure of the first read address generating circuit 303. In this conjunction, it is to be added that the first read address generating circuit may be so implemented as to avoid useless read operation although it depends on the memory device configuration.

In the figure, a group number counter 3031 (M/2-counter) and a column number counter 3032 (B-counter) serves as the means for specifying the group and the columns in the group, respectively, described previously in conjunction with the permutation. Further, a row group number counter 3033 (C-counter) serves as select means for selecting $\underline{a}$ adjacent data from the column data (including 2b data).

The column data read address is constituted simply by concatenating the bits of the group number counter 3031 and the column number counter 3032 in this order. The value of the row group number counter 3033 is employed as a select signal for selecting $\underline{a}$ concerned data from the column. The group number counter 3031, the column number counter 3032 and the row group number counter 3033 are so interconnected that with the carry in the group number counter 3031, the row group number counter 3033 is updated while with the carry in the row group number counter 3033, the column number counter 3032 is updated, as a result of which a data held at corresponding locations in the individual groups (i.e., data for which the positions of the relevant columns are same in the individual groups and whose positions in the columns are same) are contiguously read out on a time-serial basis.

(Permutating Method 2 in Preceding Stage in the Case Where $a \geq 2$)

According to the method 1 illustrated in FIG. 2, the permutation is performed in a single step, while in the case of the method 2 illustrated in FIGS. 4 and 8, the permutation is carried out in two steps.

even-numbered data is defined as the odd-numbered line, whereby the first group mentioned below is obtained. Through the similar procedure, the second group mentioned below is derived from individual groups of the second cluster, and finally the A-th group is derived from the A-th cluster, as shown in the following table 2.

TABLE 2

| First group | Second group | Third group ... | A-th group |
|---|---|---|---|
| {x(2i)},<br>i = 0~M/2 − 1 | {x(aM + 2i)},<br>i = 0~M/2 − 1 | {x(2aM + 2i)},<br>i = 0~M/2 − 1 | {x(a (A − 1)M + 2i)}<br>i = 0~M/2 − 1 |
| {x(2i + 1)},<br>i = 0~M/2 − 1 | {x(aM + 2i + 1)},<br>i = 0~M/2 − 1 | {x(2aM + 2i + 1)},<br>i = 0~M/2 − 1 | {x(a (A − 1)M + 2i + 1)}<br>i = 0~M/2 − 1 |
| {x(M + 2i)},<br>i = 0~M/2 − 1 | {x((a + 1)M + 2i)},<br>i = 0~M/2 − 1 | {x((2a + 1)M + 2i)},<br>i = 0~M/2 − 1 | {x([a(A − 1) + 1]M + 2i)}<br>i = 0~M/2 − 1 |
| {x(M + 2i + 1)},<br>i = 0~M/2 − 1 | {x((a + 1)M + 2i + 1),<br>i = 0~M/2 − 1 | {x((2a + 1)M + 2i + 1)},<br>i = 0~M/2 − 1 | {x([a(A − 1) + 1]M + 2i + 1)}<br>i = 0~M/2 − 1 |
| {x(2M + 2i)},<br>i = 0~M/2 − 1 | {x((a + 2)M + 2i)},<br>i = 0~M/2 − 1 | {x((2a + 2)M + 2i)},<br>i = 0~M/2 − 1 | {x([a(A − 1) + 2]M + 2i)}<br>i = 0~M/2 − 1 |
| {x(2M + 2i + 1)},<br>i = 0~M/2 − 1 | {x((a + 2)M + 2i + 1)},<br>i = 0~M/2 − 1 | {x((2a + 2)M + 2i + 1)},<br>i = 0~M/2 − 1 | {x([a(A − 1) + 2]M + 2i + 1)}<br>i = 0~M/2 − 1 |
| ... | | | |
| {x((a − 1)M + 2i)},<br>i = 0~M/2 − 1 | {x((2a − 1)M + 2i)},<br>i = 0~M/2 − 1 | {x((3a − 1)M + 2i)},<br>i = 0~M/2 − 1 | {x([a(A − 1) + a − 1]M + 2i)}<br>i = 0~M/2 − 1 |
| {x((a − 1)M + 2i + 1)},<br>i = 0~M/2 − 1 | {x((2a − 1)M + 2i + 1)},<br>i = 0~M/2 − 1 | {x((3a − 1)M + 2i + 1)},<br>i = 0~M/2 − 1 | {x([a(A − 1) + a − 1]M + 2i + 1)}<br>i = 0~M/2 − 1 |

In the first place, description will be directed to the case where $a \geq 2$, i.e., the number $a$ of the pipeline FFT circuits is not smaller than "2", which is then followed by the description for the case where a=1.

As described hereinbefore, the first data permutating circuit 310 is so designed as to rearrange or permutate M data sets each consisting of M point data which are time-serially continuous into a a columns. More specifically, permutation is so performed that in each of the data sets, data are arrayed in two columns. Processing procedure to this end will be described below.

M groups are classified into A clusters each having a groups to be processed in the manner as follows. Incidentally, "A" is equal to "M/a" and represents the number of M point data sets to be processed by one FFT circuit.

Starting from the first cluster, a column consisting of $b$ data of even-valued indexes (every odd-numbered data) of the first column in each of the groups belonging to the first cluster as well as a column consisting of $a$ data of odd-valued indexes (every even-numbered data) of the first column mentioned above are generated, whereon transposition is performed on the odd-numbered data and the even-numbered data by regarding them as being arrayed in a (b×a) matrix.

In succession, a column consisting of $b$ odd-numbered data and a column consisting of $b$ even-numbered data are generated from the second columns of every groups of the first cluster, whereon the odd-numbered data and the even-numbered data are transposed, being regarded as the (b×a) matrix, to be disposed laterally next to the transposed data of the first column. Through the similar procedure, columns each consisting of $b$ odd-numbered data and b even-numbered data are generated from the B-th columns of every group belonging to the first cluster, whereon the odd-numbered data and the even-numbered data are transposed on the presumption that these data are arrayed in the (b×a) matrix to be disposed laterally next to the transposed data of the (B−1)-th column. Each row of the (a×(b×B)[=a×(M/2)] matrix which is constituted by $B$ matrixes each of size (a×b) derived from the odd-numbered data is defined as the odd-numbered line while each row of the matrix of size (a×(M/2)) derived from the In practical applications, however, it is not required to wait for completion of the permutation mentioned above until the A-th group is obtained, but output processing can be started immediately after reading out from the memory the column consisting of $b$ odd-numbered data and the column of the $b$ even-numbered data by performing the transposition processing on the respective (b×a)-matrixes.

The first data permutating circuit 310 shown in FIG. 4 is so arranged that the data inputted in parallel on a 2b-by-2b basis are stored orderly 2b by 2b in one of the buffers of the double buffer memory 311 while the data are read out 2b by 2b in parallel from the other buffer of the memory 311 in the read-out order mentioned above with the data being sent out $a$ by $a$ from each of the pair of corner turners (i.e., 2a data in total are sent out from the two corner turners).

Figure 6:
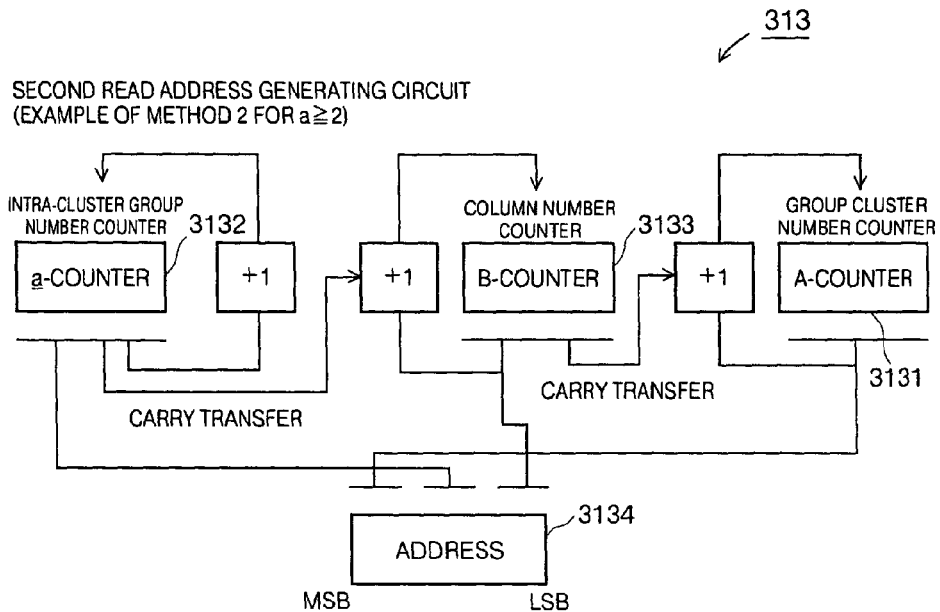
FIG. 6 is a block diagram showing a second read address generating circuit.

FIG. 6 shows a typical arrangement of the second read address generating circuit 313. In the figure, a group cluster number counter 3131 (A-counter), a group number counter 3132 (a-counter) and a column number counter 3133 (B-counter) are means for specifying the cluster, the groups in the cluster and the columns in the groups, respectively, as described hereinbefore in conjunction with the permutation. The address 3134 is constituted simply by concatenating the bits of these counters in this order.

In the second read address generating circuit 313, the group number counter 3132 and the column number counter 3133 are carry-connected such that the column number counter 3133 is updated by the carry of the group number counter 3132 by interchanging the connecting destinations of the carries of the group number counter 3132 and the column number counter 3133. Thus, the columns located at corresponding positions in every group belonging to the cluster are read out contiguously on the time serial basis.

In the second half part of the permutating method 2 in the preceding stage, i.e., in the second data permutating circuit 320, data sets each consisting of M data mutually separated by M points on a time-serial basis are generated on the basis of the results of the first half part (first data permutating circuit 310) so that they can be inputted to $a$ pipeline FFT circuits. In other words, it is necessary to permutate them in a columns.

Thus, 2a columns are formed as a whole, since each pipeline FFT circuit is implemented in two-parallel input configuration.

In the first data permutating circuit 310, the time-serially contiguous M-point data sets (each set consisting of two columns) are organized into a columns. Accordingly, by collecting subsequently the data at corresponding positions in the individual sets one-by-one, there can be acquired the data set consisting of M data mutually separated time-serially by M points on a time-serial basis. Since data in each data set are arrayed two columns, each of the columns in the group includes two data points which belong to the same set of the contiguous M-point data. Thus, when reading is performed on a column-by-column basis, there can be obtained the data for two pipeline FFTs. In general, for the a pipeline FFT circuits, read-out processing may be performed on an a/2-by-a/2 column basis.

On the presumption that one cluster is constituted by a/2 columns, each group can be divided into A clusters (since (M/2)/(a/2)=A).

The individual groups are processed on a cluster-by-cluster basis in the manner described below.

From each of the columns (i=0~a/2−1) of the first cluster belonging to the first group, every third data is fetched, starting from the leading one, to form a/2 columns each of a/2 data, every third data is fetched, starting from the third one, to form a/2 columns each of a/2 data, every third data is fetched, starting from the second one, to form a/2 columns each of a/2 data, and every third data is fetched, starting from the fourth one, to form a/2 columns each of a/2 data, whereon transposition is performed by regarding that they are each in the form of a (a/2)×(a/2) matrix. Further, from each of the columns of the first cluster belonging to the second group, every third data is fetched, starting from the leading one, to form a/2 columns each of a/2 data, every third data is fetched, starting from the third one, to form a/2 columns each of a/2, every third data is fetched, starting from the second one, to form a/2 columns each of a/2 data, and every third data is fetched, starting from the fourth one, to form a/2 columns each of a/2 data, whereon the transposition is performed by regarding that they are each in the form of a (a/2)×(a/2) matrix, to be disposed laterally next to the transposed data fetched from the first group.

Through similar procedure, a/2 columns each of a/2 data fetched third by third, staring from the leading data, in each column of the first cluster belonging to the A-th group, a/2 columns each of a/2 data fetched third by third, starting from the third data, a/2 columns each of a/2 data fetched third by third, starting from the second data, and a/2 columns each of a/2 data fetched third by third, starting from the fourth data, are transposed by regarding that they are in the form of a (a/2)×(a/2) matrix to be disposed laterally next to the data fetched from the (A−1)-th group and transposed. For the four (a/2)×(M/2) matrixes obtained in this way, each row of the first matrix is placed on a (4h+1)-th line (where h=0~a/2−1), each row of the second matrix is placed on a (4h+2)-th line (where h=0~a/2−1), each row of the third matrix is placed on a (4h+3)-th line (where h=0~a/2−1), and each row of the fourth matrix is placed on a (4h+4)-th line (where h=0~a/2−1), whereby a first group mentioned below (Table 3) is obtained.

Again, from each of the columns (i=a/2~a−1) of the next cluster belonging to the first group, data are similarly fetched in the form of (a/2)×(a/2) matrix to be transposed, while data are fetched in the form of a (a/2)×(a/2) matrix from each of the columns (i=a/2~a−1) of the next cluster belonging to the second group to be transposed and disposed laterally next to the transposed data of the first group. Similarly, from each of the columns (i=a/2~a−1) of the next cluster belonging to the A-th group, data are fetched in the form of a (a/2)×(a/2) matrix to be transposed and then disposed laterally next to the transposed data of the (A−1)-th group. For the four (a/2)×(M/2) matrixes obtained in this way, each row of the first matrix is placed on the (4h+1)-th line (where h=0~a/2−1), each row of the second matrix is placed on the (4h+2)-th line (where h=0~a/2−1), each row of the third matrix is placed on the (4h+3)-th line (where h=0−a/2−1), and each row of the fourth matrix is placed on the (4h+4)-th line (where h=0~a/2−1), whereby a second group mentioned below is obtained. By resorting to the similar procedure, a third group can be obtained.

Subsequently, through the similar procedure, data are fetched from the columns (i=(A−1)a/2~Aa/2−1(=M/2−1) of the last clusters belonging to the first to A-th groups each in the form of the (a/2)×(a/2) matrix to be transposed, whereby four (a/2)×(M/2) matrixes are realized. In succession, each row of the first matrix is placed on the (4h+1)-th line (where h=0~a/2−1), each row of the second matrix is placed on the (4h+2)-th line (where h=0~a/2−1), each row of the third matrix is placed on the (4h+3)-th line (where h=0~a/2−1), and each row of the fourth matrix is placed on the (4h+4)-th line (where h=0~a/2−1). In this way, the A-th group mentioned below can be obtained.

TABLE 3

| First group | Second group . . . | A-th group |
|---|---|---|
| {x(2j * M + 2 * 0)}, | {x(2j * M + 2 * (a/2))}, | {x(2j * M + 2 * (a/2(A − 1)))} |
| {x((2j + 1) * M + 2 * 0)}, | {x((2j + 1) * M + 2 * (a/2)), | {x((2j + 1) * M + 2 * (a/2(A − 1)))} |
| j = 0~M/2 − 1 | j = 0~M/2 − 1 | j = 0~M/2 − 1 |
| {x(2j * M + 1 + 2 * 0)}, | {x(2j * M + 1 + 2 * (a/2))}, | {x(2j * M + 1 + 2 * (a/2(A − 1)))} |
| {x((2j + 1) * M + 1 + 2 * 0)}, | {x((2j + 1) * M + 1 + 2 * (a/2))} | {x((2j + 1) * M + 1 + 2 * (a/2(A − 1)))} |
| j = 0~M/2 − 1 | j = 0~M/2 − 1 | j = 0~M/2 − 1 |
| {x(2j * M + 2 * 1)}, | {x(2j * M + 2 * (a/2 + 1))}, | {x(2j * M + 2 * (a/2(A − 1) + 1))} |
| {x((2j + 1) * M + 2 * 1)}, | {x((2j + 1) * M + 2 * (a/2 + 1))}, | {x((2j + 1) * M + 2 * (a/2(A − 1) + 1))} |
| j = 0~M/2 − 1 | j = 0~M/2 − 1 | j = 0~M/2 − 1 |
| {x(2j * M + 1 + 2 * 1)}, | {x(2j * M + 1 + 2 * (a/2 + 1))}, | {x(2j * M + 1 + 2 * (a/2(A − 1) + 1))} |
| {x((2j + 1) * M + 1 + 2 * 1)}, | {x((2j + 1) * M + 1 + 2 * (a/2 + 1))}, | {x((2j + 1) * M + 1 + 2 * (a/2(A − ) + 1))} |
| j = 0~M/2 − 1 | j = 0~M/2 − 1 | j = 0~M/2 − 1 |
| {x(2j * M + 2 * 2)}, | {x(2j * M + 2 * (a/2 + 2))}, | {x(2j * M + 2 * (a/2 (A − 1) + 2))} |
| {x((2j + 1) * M + 2 * 2)}, | {x((2j + 1) * M + 2 * (a/2 + 2))}, | {x((2j + 1) * M + 2 * (a/2(A − 1) + 2))} |
| j = 0~M/2 − 1 | j = 0~M/2 − 1 | j = 0~M/2 − 1 |
| {x(2j * M + 1 + 2 * 2)}, | {x(2j * M + 1 + 2 * (a/2 + 2))} | {x(2j * M + 1 + 2 * (a/2 (A − 1) + 2))} |
| {x((2j + 1) * M + 1 + 2 * 2)}, | {x((2j + 1) * M + 1 + 2 * (a/2 + 2))}, | {x((2j + 1) * M + 1 + 2 * (a/2(A − 1) + 2))} |

TABLE 3-continued

| First group | Second group ... | A-th group |
|---|---|---|
| j = 0~M/2 − 1 | j = 0~M/2 − 1 | j = 0~M/2 − 1 |
| ... | | |
| {x(2j * M + 2 * (a/2 − 1))}, | {x(2j * M + 2 * (a/2 + a/2 − 1))}, | {x(2j * M + 2 * (a/2(A − 1) + a/2 − 1))} |
| {x((2j + 1) * M + 2 * (a/2 − 1))}, | {x((2j + 1) * M + 2 * (a/2 + a/2 − 1))}, | {x((2j + 1) * M + 2 * (a/2(A − 1) + a/2 − 1))} |
| j = 0~M/2 − 1 | j = 0~M/2 − 1 | j = 0~M/2 − 1 |
| {x(2j * M + 1 + 2 * (a/2 − 1))}, | {x(2j * M + 1 + 2 * (a/2 + a/2 − 1))}, | {x(2j * M + 1 + 2 * (a/2(A − 1) + a/2 − 1))} |
| {x((2j + 1) * M + 1 + 2 * (a/2 − 1))}, | {x((2j + 1) * M + 1 + 2 * (a/2 + a/2 − 1))}, | {x((2j + 1)M + 1 + 2 * (a/2(A − 1) + a/2 − 1)) |
| j = 0~M/2 − 1 | j = 0~M/2 − 1 | j = 0~M/2 − 1 |

Of the individual lines obtained in this way, two lines from the top inclusive form sequentially two parallel inputs on a two-by-two line basis for the pipeline FFT circuits, respectively. In practical applications, there is no need for waiting for complete permutation of all the groups up to the A-th group inclusive. Immediately after reading out from the memory the a/2 columns each of a/2 data fetched third by third, starting from the leading one, the a/2 columns each of a/2 data fetched third by third, starting from the third one, the a/2 columns each of a/2 data fetched third by third, starting from the second one, and the a/2 columns each of a/2 data fetched third by third, starting from the fourth one, execution of the output processing can be started by transposing them in the (a/2)×(a/2) matrixes, respectively.

In the second data permutating circuit 320 constituting a second half part of the data permutating module 3B of the preceding stage (method 2) shown in FIG. 4, the data inputted in parallel on a 2a-by-2a data basis are stored sequentially in one of the double buffer memories on a 2a-by-2a basis while the data are read out in parallel from the other memory on a 2a-by-2a basis in the read-out sequence mentioned above with the data being sent out a/2 by a/2 from each of the four corner turners (i.e., 2a data from the four corner turners in total). In particular, in the case where a=2, transposition is performed on the (1×1) matrix, which means that no corner turner function is required. In other words, the transposition can be realized merely by routing the data.

Figure 7:
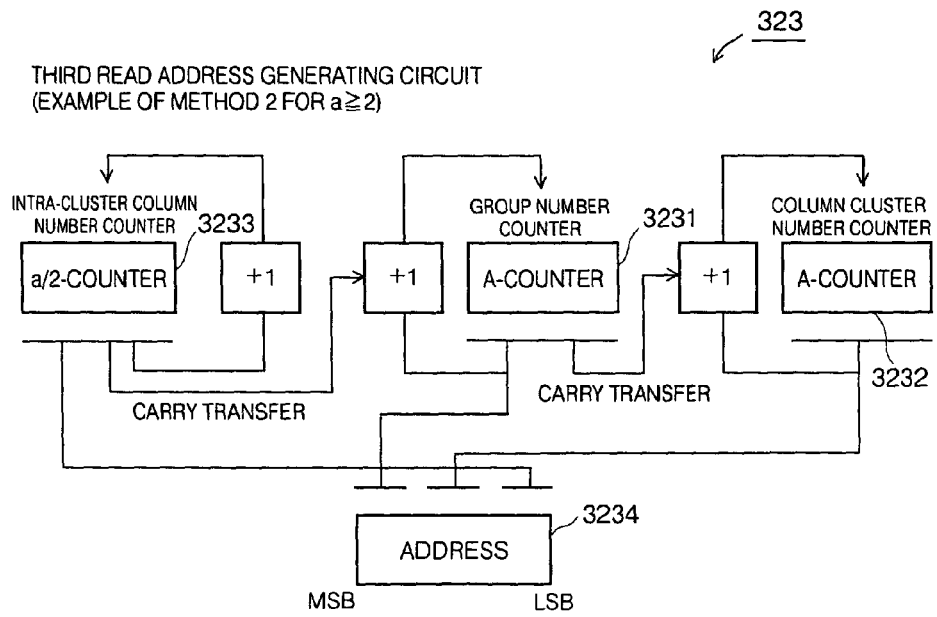
FIG. 7 is a block diagram showing a third read address generating circuit.

FIG. 7 shows a typical arrangement of the third read address generating circuit 323. In the figure, a group number counter 3231 (A-counter), a column cluster number counter 3232 (A-counter) and a column number counter 3233 (a/2-counter) serve as the means for specifying the group, the column clusters in the group and the columns in the column cluster, respectively, as described hereinbefore in conjunction with the permutation. The address is constituted simply by concatenating bits of these counter in this order. The group number counter 3231 and the column cluster number counter 3232 are carry-connected such that the column cluster number counter 3232 is updated by the carry of the group number counter 3231. Thus, reading of the column clusters located at corresponding positions in the individual groups is performed consecutively on a time-serial basis.

Operation of the data permutating module of the succeeding stage is utterly same as that of the second half part of the permutating method 2 in the preceding stage. The outputs of pipeline FFTs in the preceding stage are arrayed, as shown in the undermentioned table 4. Individual lines conform to the data output sequence from the output lines of the preceding stage (i.e., two lines correspond to one pipeline output).

TABLE 4

| First group | Second group ... | A-th group |
|---|---|---|
| {X1(2j * M + 2 * 0)}, | {X1(2j * M + 2 * (a/2))}, | {X1(2j * M + 2 * (a/2(A − 1)))} |
| {X1((2j + 1) * M + 2 * 0)}, | {X1((2j + 1) * M + 2 * (a/2))}, | {X1((2j + 1) * M + 2 * (a/2(A − 1)))} |
| j = 0~M/2 − 1 | j = 0~M/2 − 1 | j = 0~M/2 − 1 |
| {X1(2j * M + 1 + 2 * 0)}, | {X1(2j * M + 1 + 2 * (a/2))}, | {X1(2j * M + 1 + 2 * (a/2(A − 1)))} |
| {X1((2j + 1) * M + 1 + 2 * 0)}, | {X1((2j + 1) * M + 1 + 2 * (a/2))}, | {X1((2j + 1) * M + 1 + 2 * (a/2(A − 1)))} |
| j = 0~M/2 − 1 | j = 0~M/2 − 1 | j = 0~M/2 − 1 |
| {X1(2j * M + 2 * 1)}, | {X1(2j * M + 2 * (a/2 − 1))}, | {X1(2j * M + 2 * (a/2(A − 1) + 1))} |
| {X1((2j + 1) * M + 2 * 1)}, | {X1((2j + 1) * M + 2 * (a/2 + 1))}, | {X1((2j + 1) * M + 2 * (a/2(A − 1) + 1))} |
| j = 0~M/2 − 1 | j = 0~M/2 − 1 | j = 0~M/2 − 1 |
| {X1(2j * M + 1 + 2 * 1)}, | {X1(2j * M + 1 + 2 * (a/2 + 1))}, | {X1(2j * M + 1 + 2 * (a/2(A − 1) + 1))} |
| {X1((2j + 1) * M + 1 + 2 * 1)}, | {X1((2j + 1) * M + 1 + 2 * (a/2 + 1))}, | {X1((2j + 1) * M + 1 + 2 * (a/2(A − 1) + 1))} |
| j = 0~M/2 − 1 | j = 0~M/2 − 1 | j = 0~M/2 − 1 |
| {X1(2j * M + 2 * 2)}, | {X1(2j * M + 2 * (a/2 + 2))}, | {X1(2j * M + 2 * (a/2(A − 1) + 2))} |
| {X1((2j + 1) * M + 2 * 2)}, | {X1((2j + 1) * M + 2 * (a/2 + 2))}, | {X1((2j + 1) * M + 2 * (a/2(A − 1) + 2))} |
| j = 0~M/2 − 1 | j = 0~M/2 − 1 | j = 0~M/2 − 1 |
| {X1(2j * M + 1 + 2 * 2)}, | {X1(2j * M + 1 + 2 * (a/2 + 2))}, | {X1(2j * M + 1 + 2 * (a/2(A − 1) + 2))} |
| {X1((2j + 1) * M + 1 + 2 * 2)}, | {X1((2j + 1) * M + 1 + 2 * (a/2 + 2))}, | {X1((2j + 1) * M + 1 + 2 * (a/2(A − 1) + 2))} |
| j = 0~M/2 − 1 | j = 0~M/2 − 1 | j = 0~M/2 − 1 |
| ... | | |
| {X1(2j * M + 2 * (a/2 − 1))}, | {X1(2j * M + 2 * (a/2 + a/2 − 1))}, | {X1(2j * M + 2 * (a/2(A − 1) + a/2 − 1))} |
| {X1((2j + 1) * M + 2 * (a/2 − 1))}, | {X1((2j + 1) * M + 2 * (a/2 + a/2 − 1))}, | {X1((2j + 1) * M + 2 * (a/2(A − 1) + a/2 − 1))} |
| j = 0~M/2 − 1 | j = 0~M/2 − 1 | j = 0~M/2 − 1 |
| {X1(2j * M + 1 + 2 * (a/2 − 1))}, | {X1(2j * M + 1 + 2 * (a/2 + a/2 − 1))}, | {X1(2j * M + 1 + 2 * (a/2(A − 1) + a/2 − 1))} |
| {X1((2j + 1)M + 1 + 2 * (a/2 − 1))}, | {X1((2j + 1)M + 1 + 2 * (a/2 + a/2 − 1))}, | {X1((2j + 1)M + 1 + 2 * (a/2(A − 1) + a/2 − 1))} |
| j = 0~M/2 − 1 | j = 0~M/2 − 1 | j = 0~M/2 − 1 |

(Permutating Method 2 in Succeeding Stage in the Case where $a \geq 2$)

In the data permutating module 4A of the succeeding stage shown in FIG. 5, data sets each of M data separated by M points are formed from the FFT output array of the preceding stage to be permutated in a columns. In particular, data in each data set are arrayed in two columns. Since in the output of the preceding stage, M-point data sets (each set is in a column of two) are arrayed in a columns, there can be obtained the data set constituted by M data separated by M points can be obtained by collecting one-by-one the data of the corresponding positions in the individual sets.

Since data in each data set are arrayed in two columns, each of the columns in the group contains two data which belong to the same M-point data set. Thus, when reading is performed on a column-by-column basis, there can be obtained the data for the two pipeline FFT circuits. In general, for the a pipeline FFT circuits, data may be read out and permutated on an a/2-by-a/2 column basis. Each group can be divided into A clusters each constituted by a/2 columns on the presumption that every cluster consists of a/2 columns.

Subsequently, the individual groups are processed on a cluster-by-cluster basis in a manner described below. From each of the columns (i=0~a/2−1) of the first cluster belonging to the first group, every third data is fetched, starting from the leading one, to form a/2 columns each of a/2 data, every third data is fetched, starting from the third one, to form a/2 columns each of a/2 data, every third data is fetched, starting from the second one, to form a/2 columns each of a/2 data, and every third data is fetched, starting from the fourth one, to form a/2 columns each of a/2 data, whereon the data are transposed by regarding that they are each in the form of (a/2)×(a/2) matrix. Further, from each of the columns of the first cluster belonging to the second group, every third data is fetched, starting from the leading one, to form a/2 columns each of a/2 data, every third data is fetched, starting from the third one, to form a/2 columns each of a/2, every third data is fetched, starting from the second one, to form a/2 columns each of a/2 data, and then every third data is fetched, starting from the fourth one, to form a/2 columns each of a/2 data, whereon the transposition is performed by regarding that they are each in the form of (a/2)×(a/2) matrix, to be disposed laterally next to the transposed data fetched from the first group.

In a similar manner, from each of the columns of the first cluster belonging to the A group, every third data is fetched, starting from the leading one, to form a/2 columns each of a/2 data, every third data is fetched, starting from the third one, to form a/2 columns each of a/2 data, every third data is fetched, starting from the second one, to form a/2 columns each of a/2 data, and every third data is fetched, starting from the fourth one, to form a/2 columns each of a/2 data, whereon the transposition is performed by regarding that they are each in the form of (a/2)×(a/2) matrix and then disposed laterally next to the transposed data matrix of the (A−1)-th group. For the four (a/2)×(M/2) matrixes obtained in this way, each row of the first matrix is placed on the (4h+1)-th line (where h=0~a/2−1), each row of the second matrix is placed on the (4h+2)-th line (where h=0~a/2−1), each row of the third matrix is placed on the (4h+3)-th line (where h=0~a/2−1), and then each row of the fourth matrix is placed on the (4h+4)-th line (where h=0~a/2−1), whereby a first group in the table 5 mentioned later on is obtained.

Again, data are fetched from each of the columns (i=a/2~a−1) of the next cluster belonging to the first group in the form of (a/2)×(a/2) matrix to be transposed, data are fetched in the form of (a/2)×(a/2) matrix from each of the columns (i=a/2~a−1) of the next cluster belonging to the second group to be transposed and then disposed laterally next to the transposed data derived from the first group.

Similarly, from each of the columns (i=a/2~a−1) of the next cluster belonging to the A-th group, data are fetched in the form of a (a/2)×(a/2) matrix to be transposed and then disposed laterally next to the transposed data derived from the (A−1)-th group. For the four (a/2)×(M/2) matrixes obtained in this way, each row of the first matrix is placed on the (4h+i)-th line (where h=0~a/2−1), each row of the second matrix is placed on the (4h+2)-th line (where h=0~a/2−1), each row of the third matrix is placed on the (4h+3)-th line (where h=0~a/2−1), and each row of the fourth matrix is placed on the (4h+4)-th line (where h=0~a/2−1), whereby a second group on the table 5 is obtained.

Through the similar procedure, a third group can be obtained. Subsequently, through the similar procedure, data are fetched from the columns (i=(A−1)a/2~Aa/2−1 (=M/2−1) of the last clusters belonging to the first to A-th groups each in the form of the (a/2)×(a/2) matrix to be transposed, whereby A-th group of the table 5 can be obtained by establishing correspondence similarly.

TABLE 5

| First group | second group | Third group ... | A-th group |
|---|---|---|---|
| {X1(2i)}, | {X1(aM + 2i)}, | {X1(2aM + 2i)}, | {X1((A − 1)aM + 2i)} |
| {X1(2i + 1)}, | {X1(aM + 2i + 1)}, | {X1(2aM + 2i + 1)}, | {X1((A − 1)aM + 2i + 1)} |
| i = 0~M/2 − 1 | i = 0~M/2 − 1 | i = 0~M/2 − 1 | i = 0~M/2 − 1 |
| {X1(M + 2i)}, | {x((a + 1)M + 2i)}, | {X1((2a + 1)M + 2i)}, | {X1(((A − 1)a + 1)M + 2i)} |
| {X1(M + 2i + 1)}, | {x((a + 1)M + 2i + 1)}, | {X1((2a + 1)M + 2i + 1)}, | {X1(((A − 1)a + 1)M + 2i + 1)} |
| i = 0~M/2 − 1 | i = 0~M/2 − 1 | i = 0~M/2 − 1 | i = 0~M/2 − 1 |
| {X1(2M + 2i)}, | {x((a + 2)M + 2i)}, | {X1((2a + 2)M + 2i)}, | {X1(((A − 1)a + 2)M + 2i)} |
| {X1(2M + 2i + 1)}, | {x((a + 2)M + 2i + 1)}, | {X1((2a + 2)M + 2i + 1)}, | {X1(((A − 1)a + 2)M + 2i + 1)} |
| i = 0~M/2 − 1 | i = 0~M/2 − 1 | i = 0~M/2 − 1 | i = 0~M/2 − 1 |
| ... | | | |
| {X1((a − 1)M + 2i)}, | {x((2a − 1)M + 2i)}, | {X1((3a − 1)M + 2i)}, | {X1(((A − 1)a + a − 1)M + 2i)} |
| {X1((a − 1)M + 2i + 1)}, | {x((2a − 1)M + 2i + 1)}, | {X1((3a − 1)M + 2i + 1)}, | {X1(((A − 1)a + a − 1)M + 2i + 1)} |
| i = 0~M/2 − 1 | i = 0~M/2 − 1 | i = 0~M/2 − 1 | i = 0~M/2 − 1 |

In the individual lines as obtained, two lines from the top inclusive form sequentially two parallel inputs to the pipeline FFT circuits, respectively, on a two-by-two line basis. In practical applications, there is no need for waiting for complete permutation of all the groups up to the A-th group inclusive. Immediately after reading out from the memory the a/2 columns each of a/2 data fetched third by third, starting from the leading one, the a/2 columns each of a/2 data fetched third by third, starting from the third one, the a/2 columns each of a/2 data fetched third by third, starting from the second one, and the a/2 columns each of a/2 data fetched third by third, starting from the fourth one have been readout from the memory, the output processing can be started by transposing them in the form of the (a/2)/×(a/2) matrixes, respectively.

In the data permutating module of the succeeding stage shown in FIG. 5, the data inputted in parallel on a 2a-by-2a basis are stored sequentially in one of the double buffer memories while the data are read out in parallel from the other memory on a 2a-by-2a basis in the read-out sequence mentioned above with the data being sent out a/2 by a/2 from each of the four corner turners, i.e., 2a data in total from the four corner turners, similarly to the case of the second data permutating circuit 320 constituting the second half part of the data permutating method 2 in the preceding stage. The third read address generating circuit 323 is same as the second data permutating circuit.

(Multiplication of Twiddle Factors)

In succession to the data permutation in the succeeding stage, multiplication of twiddle factors is performed by the twiddle factor multiplication module. In this conjunction, the twiddle factors are such as enumerated in the table 6. The equation (1) representing the first step of N(=M×M)-point Fourier transforms is equivalent to the equation of M-point DFTs for k1, when k0 is fixed. Thus, the output index order resulting from the processing of the equation (1) with the radix 2 pipeline FFTs bears bit-reverse relation to the index order derived from the DFT equation. Accordingly, when the twiddle factor multiplication given by the equation (2) is performed in correspondence to the output index order of the radix-2 pipeline FFTs, it is necessary to use the bit-reversed value for the exponent n0 of the twiddle factor.

In the permutation performed for the input to the pipeline FFTs in the succeeding stage described hereinbefore, data array is given by the one-dimensional expression. In the two-dimensional expression, i.e., matrix expression, the values multiplied by M represent the row indexes with the remainder representing the column indexes. As the exponent of the twiddle factor, it is necessary to use the bit reverse value of the row index. Since the number of the pipeline FFT circuits is a, the rows of the data array are divided into a sets each of two rows, and each set is subdivided into A subsets each consisting of M point data. From the viewpoint of the column, the whole can be regarded as being divided into A groups.

Thus, representing the bit reverse operation by BR[ ], the array of the twiddle factors corresponding to that of the input data are such as mentioned below, where BR[ ] represents the bit reverse operation on the presumption that the numerical value parenthesized by [ ] is $\underline{m}$ bits binary data.

TABLE 6

| Twiddle factors of first group | Twiddle factors of second group . . . | Twiddle factors of A-th group |
|---|---|---|
| {W**(BR[0]×(2i))}, | {W**(BR[a + 0]×(2i))}, | {W**(BR[(A − 1)a + 0]×(2i))} |
| {W**(BR[0]×(2i + 1))}, | {W**(BR[a + 0]×(2i + 1))}, | {W**(BR[(A − 1)a + 0]×(2i + 1))} |
| i = 0~M/2 − 1 | i = 0~M/2 − 1 | i = 0~M/2 − 1 |
| {W**(BR[1]×(2i))}, | {W**(BR[a + 1]×(2i))}, | {W**(BR[(A − 1)a + 1]×(2i))} |
| {W**(BR[1]×(2i + 1))}, | {W**(BR[a + 1]×(2i + 1))}, | {W**(BR[(A − 1)a + 1]×(2i + 1))} |
| i = 0~M/2 − 1 | i = 0~M/2 − 1 | i = 0~M/2 − 1 |
| {W**(BR[2]×(2i))}, | {W**(BR[a + 2]×(2i))}, | {W**(BR[(A − 1)a + 2]×(2i))} |
| {W**(BR[2]×(2i + 1))}, | {W**(BR[a + 2]×(2i + 1))}, | {W**(BR[(A − 1)a + 2]×(2i + 1))} |
| i = 0~M/2 − 1 | i = 0~M/2 − 1 | i = 0~M/2 − 1 |
| . . . | . . . | . . . |
| {W**(BR[a − 1]×(2i))}, | {W**(BR[a + a − 1]×(2i))}, | {W**(BR[(A − 1)a + a − 1]×(2i))} |
| {W**(BR[a − 1]×(2i + 1))}, | {W**(BR[a + a − 1]×(2i + 1))}, | {W**(BR[(A − 1)a + a − 1]×(2i + 1))} |
| i = 0~M/2 − 1 | i = 0~M/2 − 1 | i = 0~M/2 − 1 |

(Data Permutation Method 2 in the Case where a=1)

Next, description will turn to the case where a=1, i.e., the number of the pipeline FFT circuit in each stage is one. As in the case of a≧2, it is presumed that the time-serial input data {x(t):t=0~2**m−1} are inputted 2b by 2b in parallel and that contiguous data of each input data line is divided into sets on a B-by-B basis. On the presumption, each data can be divided into M groups each consisting of M-point data, as shown in the undermentioned table 7, where B represents the input count number up to M point data, i.e., B=M/2b where 2b represents the input parallelism.

TABLE 7

| | First group | Second group | Third group ... | M-th group |
|---|---|---|---|---|
| Input data line 1: | | | | |
| | {x(2bj)}, j = 0~B − 1 | {x(M + 2bj)}, j = 0~B − 1 | {x(2M + 2bj)}, j = 0~B − 1 | {x((M − 1)M + 2bj)} j = 0~B − 1 |
| Input data line 2: | | | | |
| | {x(2bj + 1)}, j = 0~B − 1 | {x(M + 2bj + 1)}, j = 0~B − 1 | {x(2M + 2bj + 1)}, j = 0~B − 1 | {x((M − 1)M + 2bj + 1)} j = 0~B − 1 |
| Input data line 3: | | | | |
| | {x(2bj + 2)}, j = 0~B − 1 | {x(M + 2bj + 2)}, j = 0~B − 1 | {x(2M + 2bj + 2)}, j = 0~B − 1 | {x((M − 1)M + 2bj + 2)} j = 0~B − 1 |
| ... | | | | |
| Input data line 2b: | | | | |
| | {x(2bj + 2b − 1)}, j = 0~B − 1 | {x(M + 2bj + 2b − 1)}, j = 0~B − 1 | {x(2M + 2bj + 2b − 1)}, j = 0~B − 1 | {x((M − 1)M + 2bj + 2b − 1)} j = 0~B − 1 |

(Data Permutating Method in Preceding Stage in the Case where $\underline{a}$=1)

Firstly, referring to FIG. 8, the first data permutating circuit 330 shown in this figure is so arranged as to permutate M data sets each of M point data contiguous time-serially to one column. In particular, in each of the data sets, the data are so permutated to be two columns. Procedure to this end will so described below. M groups are processed as follows.

In the first column of the first group, a column consisting of $\underline{b}$ odd-numbered data and a column consisting of $\underline{b}$ even-numbered data are formed, whereon the odd-numbered data and the even-numbered data are transposed by regarding that they are in the form of (b×1) matrix. Subsequently, a column consisting of $\underline{b}$ odd-numbered data and a column consisting of $\underline{b}$ even-numbered data are generated from the second column of first group, whereon the odd-numbered data and the even-numbered data are transposed, being regarded as the (b×1) matrix, to be disposed laterally next to the transposed data of the first column.

Through the similar procedure, a column consisting of $\underline{b}$ odd-numbered data and a column consisting of $\underline{b}$ even-numbered data are generated from the B-th column of first group, whereon the odd-numbered data and the even-numbered data are transposed on the presumption that these data are arrayed in the (b×1) matrix to be disposed laterally next to the data transposed from the (B−1)-th column. The row of 1×(b×B) [=1×(M/2)] matrix which is constituted by $\underline{B}$ matrixes each of a size (1×b) derived from the odd-numbered data is defined as the odd-numbered line while the row of the matrix of a size (1×(M/2)) derived from the even-numbered data is defined as the even-numbered line, whereby the first group shown in the table 8 mentioned below is obtained.

Through the similar procedure, the second group shown in the table 8 mentioned below is derived from the second group. By carrying out the similar procedure, there can finally be obtained the M-th group shown in the table 8 from the M-th group. In practical application, however, it is unnecessary to wait for completion of the permutation mentioned above until all the groups including the M-th group are obtained, but output processing can be started immediately after reading out from the memory the column consisting of $\underline{b}$ odd-numbered data and the column of the $\underline{b}$ even-numbered data by executing the transposition processing on these data regarded as being arrayed in the (b×1)-matrix.

TABLE 8

| First group | Second group | Third group ... | M-th group |
|---|---|---|---|
| {x(2i)}, | {x(M + 2i)}, | {x(2M + 2i)}, | {x((M − 1)M + 2i)} |
| {x(2i + 1)}, | {x(M + 2i + 1)}, | {x(2M + 2i + 1)}, | {x((M − 1)M + 2i + 1)} |
| i = 0~M/2 − 1 | i = 0~M/2 − 1 | i = 0~M/2 − 1 | i = 0~M/2 − 1 |

The first data permutating circuit 330 shown in FIG. 8 is so arranged that the data inputted in parallel on a 2b-by-2b basis are stored sequentially on a 2b-by-2b basis in one of the double buffer memories while the data are read out in parallel from the other memory on a 2b-by-2b basis in the read-out order mentioned previously with the data being sent out one by one from each of the two sets of corner turners (parallel-in, serial-out circuit in this case), i.e., 2 data in total are sent out from the two corner turners.

Figure 10:
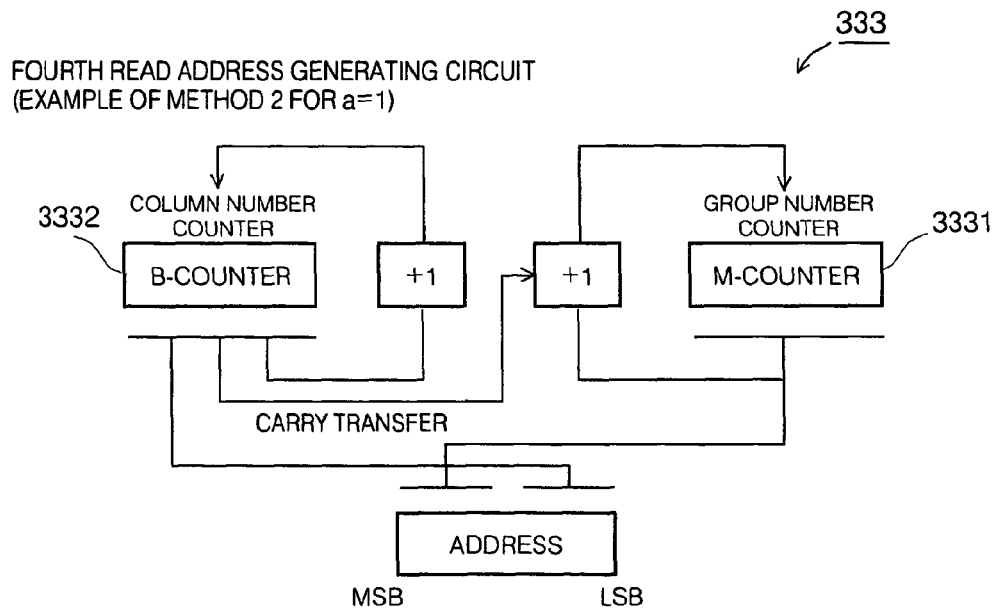
FIG. 10 is a block diagram showing a fourth read address generating circuit in the case where a̲ is "1".

FIG. 10 shows an exemplary arrangement of the fourth read address generating circuit 333. In the figure, a group number counter (M-counter) 3331 and a column number counter (B-counter) 3332 serve as the means for specifying the groups and the columns in the groups, respectively, as described hereinbefore in conjunction with the permutation. The address is constituted simply by concatenating the bits of these counters in this order.

Next, in the second data permutating circuit 340, data sets each consisting of M data separated time-serially by M points are formed on the basis of the results of the first half part so that they can be inputted to one pipeline FFT circuit. In other words, it is necessary to permutate or rearrange them in a column of one.

In the first data permutating circuit 330 of the preceding stage, the time-serially contiguous M point data sets (each set consisting of two columns) are organized into one column. Accordingly, by collecting subsequently the data at the corresponding positions in the individual sets one-by-one, there can be obtained the data set constituted by M data mutually separated by M points time-serially. Since the data in each set are arrayed in two columns, two data of each column in the group belong to other set also consisting of M data separated by M points. Assuming that the whole column is to be read out on a column-by-column basis, the other column is not immediately required but repeated read operation is required since only one set of pipeline FFT circuit is provided. However, because the pipeline FFT circuit is so implemented as to have two-parallel inputs/outputs, other one data of the same set of M data separated by M points is required. In other words, data read operation has to be performed simultaneously from the two groups.

The arrangement or configuration to this end may be same as that described hereinbefore in conjunction with the method 1 carried out by the data permutating module 3A of the preceding stage by reference to FIG. 2. In other words, the data groups obtained from the first data permutating circuit 330 are stored in the buffer memory which is divided into two banks, i.e., the odd-numbered groups are stored in one bank with the even-numbered groups being stored in the other bank. From each of the groups stored in the banks, respectively, data is read out one by one, starting from the leading data, and hence two data in total are inputted to the pipeline FFT circuit as two parallel input data. More specifically, from the individual groups stored in the banks, data located at corresponding positions in the individual groups are read out one by one, e.g. in the order of one leading data of the leading group, one leading data of succeeding group, one leading data of another succeeding group and so forth up to the last group (M/2-th group), as a result of which a first group shown in the undermentioned table 9 is obtained. Again, the succeeding data of the leading group, the succeeding data of the second group and so forth are read out until the data of the individual groups have been exhausted, whereby M groups up to the M-th group shown in the table 9 are obtained.

TABLE 9

| First group | Second group | Third group . . . | M-th group |
|---|---|---|---|
| {x(M(2j))}, | {x(M(2j) + 1)}, | {x(M(2j) + 2)}, | {x(M(2j) + M − 1)} |
| {x(M(2j + 1))}, | {x(M(2j + 1) + 1)}, | {x(M(2j + 1) + 2)}}, | {x(M(2j + 1) + M − 1)} |
| j = 0~M/2 − 1 | j = 0~M/2 − 1 | j = 0~M/2 − 1 | j = 0~M/2 − 1 |

In each of the groups as obtained, two lines of data constitute two parallel inputs to the pipeline FFT circuit. In practical application, however, it is not necessary to wait for completion of the permutation mentioned above until the M-th group is obtained. The data can be read out from the two banks to be immediately outputted to the pipeline FFT circuit.

The second data permutating circuit 340 shown in FIG. 8 is implemented such that the data inputted thereto in parallel two by two are stored in one of the double buffer memories on a two-by-two basis which alternately changing over the double buffer memories every time M data have been stored in one of the double buffer memories, while two data are simultaneously read out from two banks, respectively, of the other memory, whereon the one necessary data of the two read out from the two banks, respectively, and hence two data in total are sent out.

Figure 11:
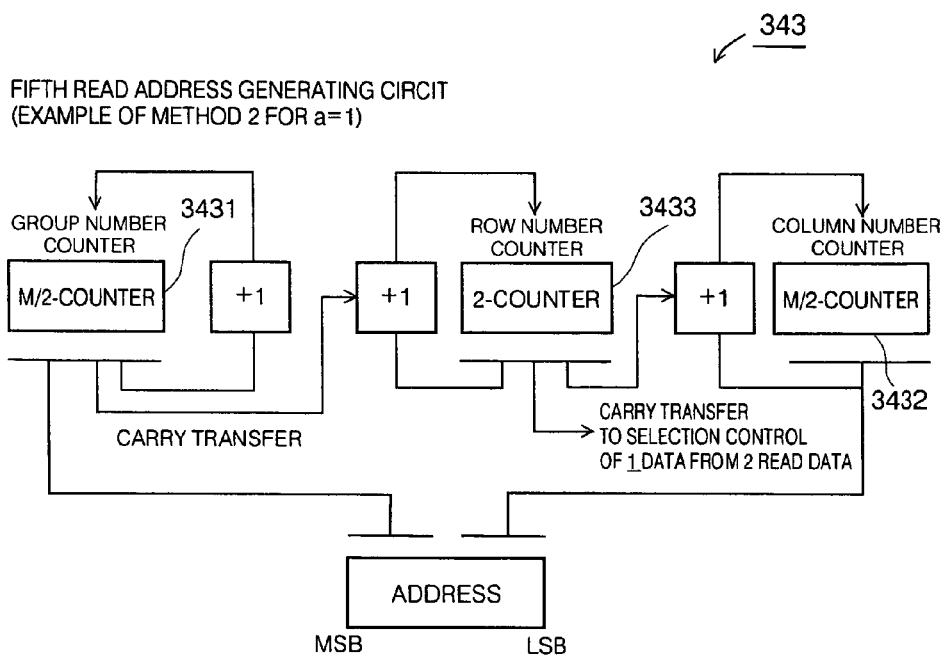
FIG. 11 is a block diagram showing a fifth read address generating circuit in the case where a̲ is "1".

FIG. 11 shows an exemplary arrangement or configuration of the fifth read address generating circuit 343. In the figure, a group number counter 3431 (M/2-counter) and a column number counter 3432 (M/2-counter) serve as the means for specifying the group and the column in the group, respectively, as described previously in conjunction with the data permutation. Further, a row number counter 3433 (2-counter) serves as select means for selecting one data from the column data (including two data). The column data read address is constituted simply by concatenating the bits of the group number counter 3431 and the column number counter 3432. The value of the row number counter 3433 is employed as a select signal for selecting one concerned data from the column. The group number counter 3431, the column number counter and the row number counter 3433 are so interconnected that with the carry in the group number counter 3431, the row number counter is updated while with the carry in the row number counter 3433, the column number counter is updated, as a result of which one data held at corresponding locations in the individual groups (i.e., data for which the positions of the relevant columns are same in the individual groups and whose positions in the columns are same) is successively read out on a time-serial basis.

(Data Permutating Method in Succeeding Stage in the Case where a=1)

Operation of the data permutating module 4B of the succeeding stage shown in FIG. 9 is utterly same as that of the second data permutating circuit 340 of the data permutating module of the preceding stage (second half part of the method 2). The outputs of the pipeline FFTs in the preceding stage are in the array such as shown in the undermentioned table 10. Individual lines correspond to the data output sequences from the FFT output lines of the preceding stage.

TABLE 10

| First group | Second group | Third group . . . | M-th group |
|---|---|---|---|
| {x1(M(2j))}, | {x1(M(2j) + 1)}, | {x1(M(2j) + 2)}, | {x1(M(2j) + M − 1)} |
| {x1(M(2j + 1))}, | {x1(M(2j + 1) + 1)}, | {x1(M(2j + 1) + 2)}, | {x1(M(2j + 1) + M − 1)} |
| j = 0~M/2 − 1 | j = 0~M/2 − 1 | j = 0~M/2 − 1 | j = 0~M/2 − 1 |

In the data permutating module 4B of the succeeding stage, data sets each of M data separated by M points from the FFT output array of the preceding stage are formed and permutated so as to be in one column. More specifically, data in each data set are arrayed in two columns. Since in the FFT output of the preceding stage, M-point data sets (each set constituted by two columns) are arrayed in one column, there can be obtained the data set constituted by M data spaced or separated by M points by collecting the data at corresponding positions in the individual sets on a one-by-one basis.

Since data in the set are arrayed in two columns, two data of each column in the group belong to another set consisting of M data separated by M points. Assuming that read operation is performed on a column-by-column basis, the other column than that being read is not immediately required but repeated read operation is required since only one pipeline FFT circuit is provided. However, because the pipeline FFT circuit is implemented as two-parallel input/output, the other one data of the same set consisting of M data separated by M points is required. In other words, data read operation has to be performed simultaneously from the two groups. The arrangement to this end may be same as that described hereinbefore in conjunction with the method 1 carried out by the data permutating module 3A of the preceding stage. In other words, the data groups obtained from the pipeline FFT circuit of the preceding stage are stored in the buffer memory which is divided into two banks (bank A, bank B), i.e., the odd-numbered groups are stored in one bank with the even-numbered groups being stored in the other bank, respectively. Data is read out one by one, starting from the leading data of the corresponding group in the bank, and hence two data in total are inputted to the pipeline FFT circuit as two parallel input data.

More specifically, from each group stored in the bank, data located at corresponding positions in the individual groups are read out one by one, e.g. in the order of one leading data of the leading group, one leading data of succeeding group, one leading data of another succeeding group and so forth up to the last group (M/2-th group) inclusive thereof, as a result of which a first group shown in the undermentioned table 11 is obtained. Again, the succeeding data of the leading group, the succeeding data of the second group and so forth are read out until the data of the individual groups have been exhausted, whereby M groups up to the M-th group shown in the table 9 are acquired. Subsequently, after changing over the bank to the other one, processing is performed in the utterly same manner as described above.

TABLE 11

| First group | Second group | Third group . . . | M-th group |
|---|---|---|---|
| {x1 (2i)}, | {x1 (M + 2i)}, | {x1 (2M + 2i)}, | {x1 ((M − 1)M + 2i)} |
| {x1 (2i + 1)}, | {x1 (M + 2i + 1)}, | {x1 (2M + 2i + 1)}, | {x1 ((M − 1)M + 2i + 1)} |
| i = 0~M/2 − 1 | i = 0~M/2 − 1 | i = 0~M/2 − 1 | i = 0~M/2 − 1 |

In each of the groups as obtained, the lines constitute two parallel inputs to the pipeline FFT circuit. In practical application, however, it is not required to wait for completion of the permutation described above until all the groups up to the M-th group have been obtained. The data can be read out from the two banks to be immediately outputted to the pipeline FFT circuit.

Similarly to the second data permutating circuit 340 (method 2) of the data permutating module 3C of the preceding stage, the data permutating module 4B of the succeeding stage shown in FIG. 9 is implemented such that the data inputted thereto in parallel on a two-by-two basis are stored two by two in one of the double buffer memories by alternately changing over the banks 341A' and 341B' every time M data have been stored, while two data are simultaneously read out from the two banks, respectively, of the other memory, whereon one necessary data of the two read out from each of the two banks are sent out. The fifth read address generating circuit 343' is implemented in the same configuration as the fifth read address generating circuit 343 of the second data permutating circuit 340 of the first data permutating circuit 330 in the preceding stage.

(Multiplication of Twiddle Factor in the Case a=1)

In succession to the data permutation in the succeeding stage, multiplication of twiddle factors is performed by the twiddle factor multiplication module. In this conjunction, in the case where the number of pipeline FFT in each stage is "1", i.e., a=1, the twiddle factors are such as enumerated in the table 12 on the presumption that a=1 instead of a≧2 and A=M. In the table, BR[ ] represents the bit reverse operation with the numerical value parenthesized by [ ] being m bits binary data.

TABLE 12

| Twiddle factor of first group | Twiddle factor of second group . . . | Twiddle factor of M-th group |
|---|---|---|
| {W**(BR[0] × (2i))}, | {W**(BR[1] × (2i))}, | {W**(BR[(M − 1)] × (2i))} |
| {W**(BR[0] × (2i + 1))}, | {W**(BR[1] × (2i + 1))}, | {W**(BR[(M − 1)] × (2i + 1))} |
| i = 0~M/2 − 1 | i = 0~M/2 − 1 | i = 0~M/2 − 1 |

(Parallel Structurization)

With the apparatus alone, there arise the case where the input rate of data can not be coped with due to restrictions imposed from the viewpoint of the package and others. By way of example, there may be mentioned the case where the input rate of data is equal to operation rate of the apparatus and the data input parallelism 2b is greater than the total pipeline width 2a of the pipeline FFTs and others. As the measures for tackling the problem, there is known a method according to which the apparatuses are disposed in parallel. As a simple implementation of this method, the data input lines may be coupled to the individual apparatuses through the medium of multiplexer. However, in the case of the data permutating method 2 in the preceding stage, it is advantageous from the standpoint of control and compact implementation to integrate the first data permutating circuits constituting the first half parts of the preceding stage data permutating modules (method 2) and demultiplex the data upon reading from the buffer memories.

Figure 12:
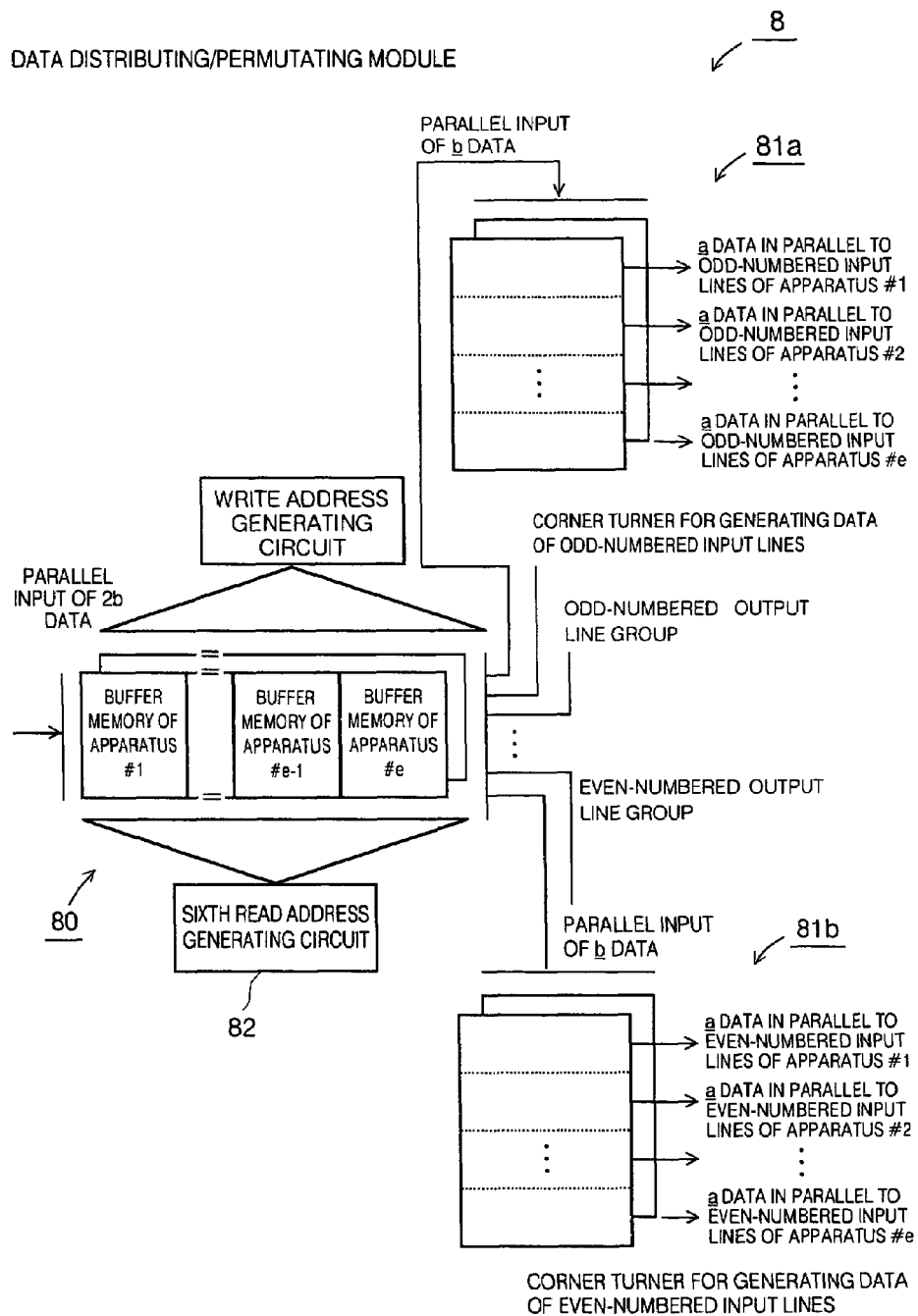
FIG. 12 is a block diagram showing a structure of a data distributing/permutating unit.

FIG. 12 shows an arrangement of a data distributing/permutating module 8 suited for the scheme mentioned just above.

In the arrangement shown in FIG. 12, the preceding stage data permutating module is implemented in the same structure as the second half part of the preceding stage data permutating module described hereinbefore in conjunction with the method 2. Consequently, the data permutation module in the succeeding stage of each apparatus is implemented in the same structure as the data permutating module of the preceding stage, as is obvious from the foregoing description. In that case, the number e of the apparatuses disposed in parallel should be selected such that (2b)/(2a)=b/a. In more concrete, it is a power of "2".

The size (number of words) of the integrated buffer memory is so selected as to be equal to the product of the number of data to undergo Fourier transform (also referred to as the Fourier transform point number) and the number of the apparatuses disposed in parallel with the memory size corresponding to the Fourier transform point number being allocated to keep data for apparatuses each (the memory size is doubled when the buffering part is included). Further, the size of the corner turners for the data permutation is selected to correspond to the multiple of the number of the apparatuses disposed in parallel. Writing to the integrated buffer is performed orderly on a Fourier transform point number basis for each apparatus. By contrast, reading from each apparatuses-allocated area is effected sequentially a times, i.e., for a columns, on a 2b-by-2b basis in parallel, to be outputted to the corner turners, as described hereinbefore in conjunction with the data permutation (method 2) in the preceding stage. In the paired corner turners, transposing operation is performed every time the number of data which corresponds to the product of the number of data to be transposed at a time per apparatus and that of the apparatuses disposed in parallel, i.e., (b×a×e)=b×a×(b/a)=b×b data, have been buffered, whereon a data are simultaneously outputted in parallel to the individual apparatuses (odd and even number output lines 2a in parallel for each apparatus and 2b in parallel on the whole).

Figure 13:
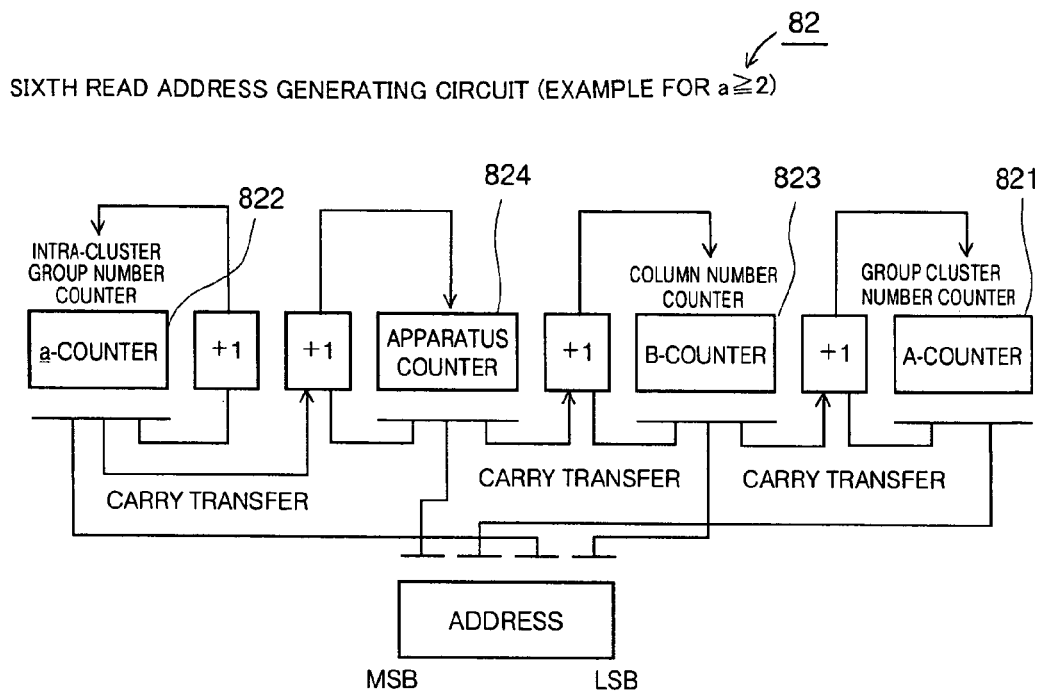
FIG. 13 is a block diagram showing a sixth read address generating circuit in the case where a̲ is not smaller than "2".

In the data distributing/permutating module 8, a sixth read address generating circuit 82 corresponding to the demultiplexer control for the data read operation is implemented in such configuration as shown in FIG. 13. As can be seen from the figure, an apparatus counter 824 is additionally provided for the purpose of controlling selection of individual apparatuses-allocated areas of the buffer memory. In the figure, a group cluster number counter 821 (A-counter), a group number counter 822 (a-counter) and a column number counter 823 (B-counter) serve as the means for specifying the cluster, the groups in the cluster and the columns in the groups, respectively, similarly to the first permutating circuit (first half part) designed for carrying out the permutating method 2 as described hereinbefore. Further, the apparatus counter serves as the means for specifying the object data (clusters) of the individual apparatuses. The address is constituted simply by concatenating the bits of the apparatus counter 824, the group cluster number counter 821, the group number counter 822 and the column number counter 823 in this order.

With the structurization described above, carry connection is made such that the apparatus counter 824 is updated by the carry of the group number counter 822, the column number counter 823 is updated by the carry of the apparatus counter 824 and the group cluster number counter 821 is updated by the carry of the column number counter 823. Thus, the columns located at corresponding positions in the individual groups of the cluster (i.e., a columns) are contiguously read out on a time series basis. Further, the addresses are so generated that when a columns of the data to be processed by a specific one of the apparatuses have been read out, then a columns of the data to be processed by the next or succeeding apparatus are read out.

Figure 14:
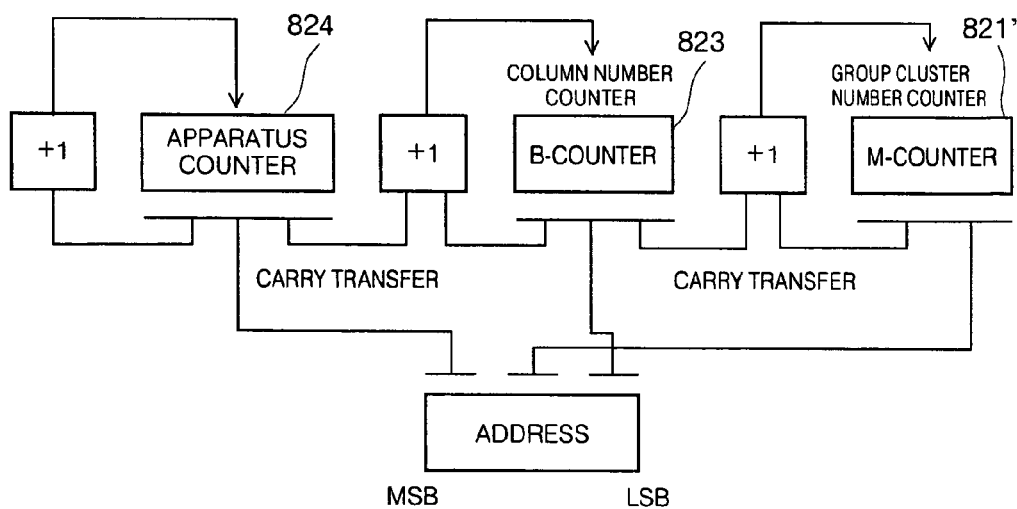
FIG. 14 is a block diagram showing the sixth read address generating circuit in the case where a̲ is "1".

Incidentally, in the case where a=1, then A=M. Accordingly, the sixth read address generating circuit shown in FIG. 13 is modified to the structure shown in FIG. 14 in which the a counter shown in FIG. 13 is spared.

(Bypass Processing)

In the foregoing description, it has been presumed that the Fourier transform point number in the preceding stage is same as the Fourier transform point number in the succeeding stage. In this conjunction, it is however noted that the flexibility or general-purposeness of the apparatus increases when the transform point number can be made variable upon mode change-over. According to Japanese Patent No. 2848134, it is taught that with an $M(=R^{}M)$–point radix R pipeline FFT circuit having R parallel inputs/outputs, Fourier transform can be performed for numbers of points $M/(R^{}1)$, $M/(R^{}2)$, $M/(R^{}3)$, . . . , R by setting appropriately the individual stages of pipelines including the data permutation and arithmetic operation modules.

In the following, description will briefly be made of the case where R=2, i.e., the radix 2 pipeline FFT. The $M(=2^{**}m)$-point radix 2 pipeline FFT circuit of parallel inputs/outputs is designed to perform Fourier transform on the data of M Fourier transform points. More specifically, M input data is divided by two to thereby generate two parallel inputs data formed by serially arraying the divided input data, the two parallel inputs data being then supplied to a fast Fourier transform (FFT) elementary circuit of two parallel inputs/outputs constituted by a data permutating circuit module and an arithmetic module. The elementary circuit of two parallel inputs/outputs mentioned above is defined as one stage, and M stages are arrayed in series for performing the Fourier transform.

The data permutating circuit module is so arranged as to permutate M input data such that paired data composed of those data which are mutually separated by $M/(2^{**}1)$ at the first stage, paired data composed of those data which are mutually separated by $M/(2^{*}2)$ at the second stage, paired data composed of those data which are mutually separated by $M/(2^{**}3)$ at the third stage, and hence paired data composed of those data which are mutually separated by one at the final stage constitute the two parallel inputs for the arithmetic modules, respectively. In each of the arithmetic modules, one of the two parallel inputs is multiplied by a twiddle factor, whereon the product resulting from the multiplication and the other input undergo the butterfly operation (for determining a sum and a difference of the two inputs).

In the $M(=2^{}m)$-point fast Fourier transform circuit including m elementary circuits mentioned above, it is shown in Japanese Patent No. 2848134 that such bypass processing can be carried out that the data permutation is performed without effecting the arithmetic operation with the permutated data being output intactly at the first to K-th stages, whereas at the succeeding stages, the data permutation and the arithmetic operation are performed, to thereby realize the Fourier transform of $M/(2^{}K)$ data (where K represents a positive integer and K<m). Even for given input data of a maximum number of transform points, i.e., number of data to undergo the transform, result of the transform can be obtained on a definite number basis which is determined by setting appropriately the bypass function as applied. This will be described below.

At first, description will be directed to an example of the data permutation in the case where radix is "2", which will be followed by the description concerning the transform which involves the result in a definite form on a transform point number basis by the permutation method as adopted regardless of application of the bypass function. Let's designate by x and y the ports of the two parallel inputs, respectively, of the data permutating module of the elementary circuit while designating by a and b the ports of the two parallel outputs, respectively. Then, in the first stage, data permutation is effected such that when one string of M point time-serial data is supplied to two input ports via a demultiplexer or alternatively when M point time-serial data is divided just at a midpoint, whereon temporally earlier half of $M/(2^{}1)$ time-serially contiguous data is supplied to the port x with the later half of $M/(2^{}1)$ time-serially contiguous data being supplied to the port y, then the temporally earlier half of $M/(2^{}1)$ contiguous data are outputted from the port a while the temporally later half of $M/(2^{}1)$ contiguous data are outputted from the port b.

In the second stage, data permutation is performed such that $M/(2^{}1)$ data inputted through the input port x is divided into two parts, whereon the temporally earlier half of $M/(2^{}2)$ data is transferred to the output port a with the temporally later half of $M/(2^{}2)$ data being transferred to the output port b. Thereafter, $M/(2^{}1)$ data inputted through the input port y is divided by two, whereon the temporally earlier half of $M/(2^{}2)$ data is transferred to the output port a with the temporally later half of $M/(2^{}2)$ data being transferred to the output port b.

Further, in the third stage, data permutation is effected such that the first $M/(2^{}2)$ data inputted through the input port x is firstly divided by two, whereon the temporally earlier half of $M/(2^{}3)$ data is transferred to the output port a with the temporally later half of $M/(2^{}3)$ data being transferred to the output port b. Thereafter, the first $M/(2^{}2)$ data inputted through the input port y is divided by two, whereon the temporally earlier half of $M/(2^{}3)$ data is transferred to the output port a with the temporally later half of $M/(2^{}3)$ data being transferred to the output port b. Again, the succeeding remaining $M/(2^{}2)$ data from the input port x is divided by two, whereon the temporally earlier half of $M/(2^{}3)$ data are transferred to the output port a with the temporally later half of $M/(2^{}3)$ data being transferred to the output port b. Further, the succeeding remaining $M/(2^{}2)$ data from the input part y are divided by two, whereon the temporally earlier half of $M/(2^{}3)$ data is transferred to the output port a with the temporally later half of $M/(2^{}3)$ data being transferred to the output port b. In the fourth stage, the fifth stage et seq., data are divided finely to be permutated.

In the data permutation described above, the data making appearance at the output ports a and b, respectively, of the first stage are time-serially separated just by M/(21) samples. Similarly, in the second stage, the M/(21) contiguous data are divided by two to be fed to the output ports a and b, respectively. Accordingly, the data making appearance at the output ports a and b are separated or distanced by M/(22) samples which is a half of M/(21) samples. Similarly, in the third stage, the M/(22) contiguous data are divided by two to be transferred to the output ports a and b, respectively. Accordingly, the data making appearance at the output ports a and b are separated by M/(23) samples which is a half of M/(2**2) samples.

In this way, at the m-th stage, data are separated by M/(2**m)=M/M=1, which conforms to the data alignment to be ensured for the arithmetic module, as imposed by the FFT algorithm.

In the fast Fourier transform circuit which incorporates at each stage the elementary circuit including the data permutating module in which the permutating method described above is adopted, when the bypass processing, i.e., bypass function that the data permutation is performed without being accompanied with the arithmetic operation with the permutated data being transferred intactly to the succeeding stage, is applied till the first stage inclusive, it will be appreciated from the previous description concerning the permutation that in the second stage, of the M contiguous data, the earlier half of M/(21) data samples is firstly divided by two to be transferred to the arithmetic module, which is then followed by division of the later half of M/(21) data samples by two and transfer to the arithmetic module. Thus, the results of the M/(21)-point Fourier transform are obtained, being separated by M/(21) samples. Further, when the bypass function is applied till the second stage inclusive, it will be appreciated from the previous description concerning the permutation that in the third stage, contiguous M/(22)-based data are processed in the temporally descending order, i.e., divided by two and transferred to the arithmetic module, and thus the results of the M/(22)-point Fourier transform are obtained, being separated by M/(2**2) data samples. The same holds true for the succeeding stages. Thus, it is apparent that even when the bypass function is applied, results of the transform can be obtained in the definite form for a given number of transform points.

As the radix 2 pipeline FFT circuit of the preceding stage of the present invention, the radix 2 pipeline FFT circuit disclosed in Japanese Patent No.2848134, i.e., in which each stage is imparted with the bypass function described previously is used and the bypass function is applied to the stages from the first to the necessary one. Then, Fourier transform can be performed for N/2=(M/2)×M, N/(22)={M/(22)}×M, N/(23)={M/(23)}×M, . . . {N/(M/2)}× M=2×M points. This will be elucidated below.

Since the Fourier transform point number, i.e., the number of data for Fourier transform, can be expressed by α×M, the data supplied to the pipeline FFT of the preceding stage may be fetched α by α every M-th data to be supplied to the pipeline FFT on a α-by-α basis. However, in the case of the radix 2 pipeline FFT disclosed in Japanese Patent No. 2848234, when the data are supplied thereto M(=α×(M/α)) by M, data are separated to undergo sequentially the α-point FFT, whereby (M/α) sets of data are outputted. This implies that if the data permutating module of the preceding stage of the present invention described hereinbefore is used the columns of individual groups of the output data {X1(n)} from the pipeline FFT of the preceding stage are virtually partitioned into M/α sets on an α/2-column basis and the output sequence is utterly same as that of the pipeline FFT of the preceding stage of the (M×M)-point pipeline FFT. Thus, the data to be inputted to the pipeline FFT of the succeeding stage may be fetched one by one from the corresponding positions of the M groups, respectively, (i.e., M data in total are fetched), which is nothing but the data permutation performed in the succeeding stage described previously. Further, in the case where the bypass function is applied up to the last arithmetic operation in the preceding stage, the very input data strings for the preceding stage pipeline FFT are sequentially outputted intactly. Accordingly, after the data permutation in the data permutating module of the succeeding stage, there can be obtained the original time-serially contiguous M-point based data.

By supplying the data thus obtained to the succeeding stage pipeline FFTs, the results of the M-point FFTs can be obtained sequentially. By employing in the succeeding stage the radix 2 pipeline FFTs imparted with the same bypass function as that of the preceding stage and performing the data permutation while bypassing the arithmetic operation sequentially from the leading one, results of the FFT are obtained for the number of points less than M/2 points inclusive. As is apparent from the above, according to the instant patent, there can also be implemented the Fourier transform apparatus having a function capable of performing the Fourier transform for N/2 . . . 2 points by adopting the radix 2 pipeline FFTs having the function to bypass the arithmetic operation itself in the preceding and succeeding stages.

(64-Point Fast Fourier Transform Apparatus)

Figure 15:
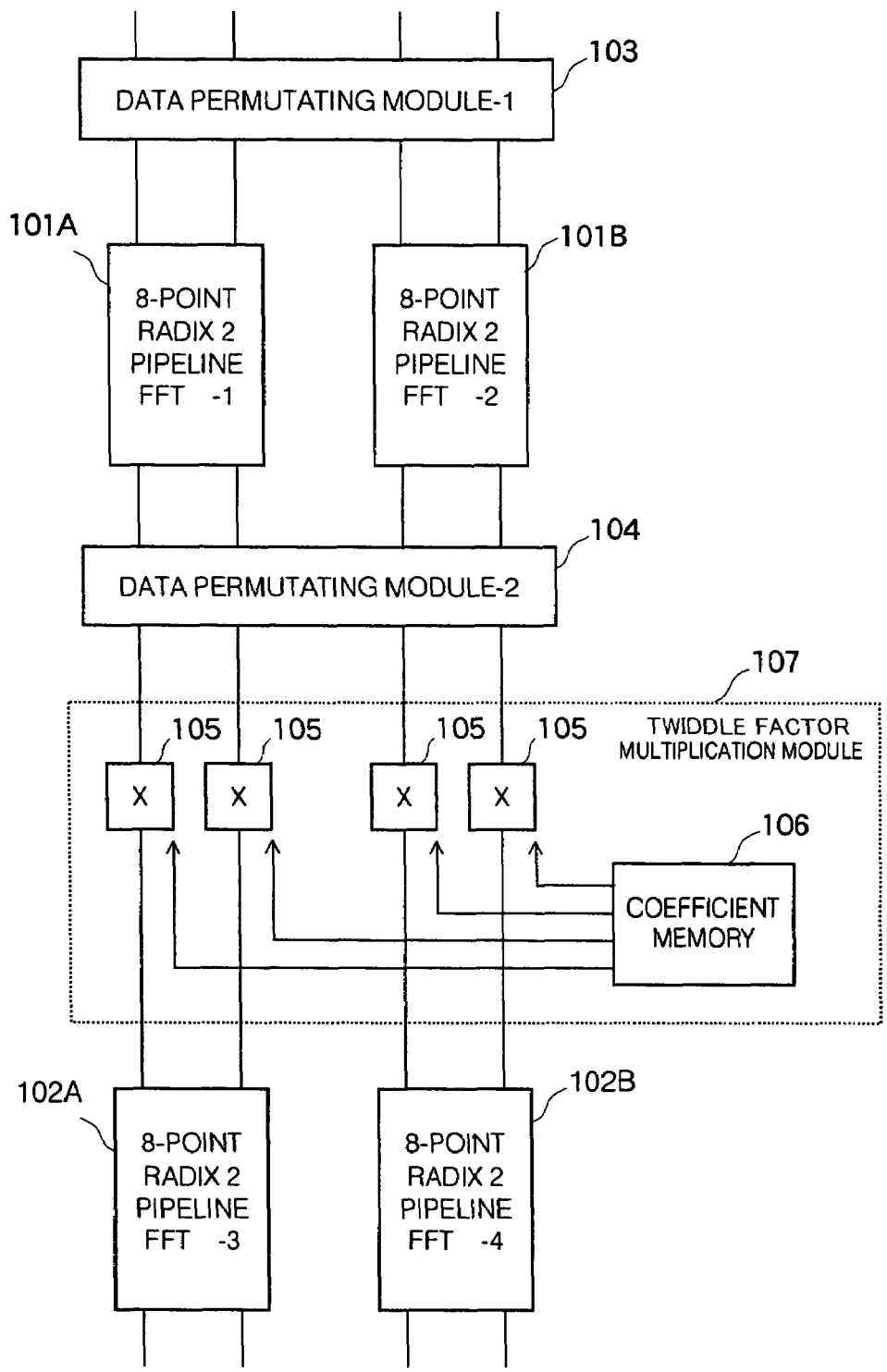
FIG. 15 is a block diagram showing 64-point FFT.

An exemplary structure for realizing 64-point FFT is shown in FIG. 15. It is presumed that the data input parallelism is four with the pipeline width being 4 in total and that the data permutating method carried out by the preceding stage data permutating module 103 conforms to the method 2 described hereinbefore. Decomposition of 64-point FFTs by 8×8 results in discrete Fourier transforms each of point number M=8 in both the preceding and succeeding stages, as mentioned below.

$$Y(n) = \sum_{k=0}^{63} y(k) \times W^{**}(n \times k) \tag{0}$$

where $W = exp(-2\pi j/64)$ $n, k = 0 \sim 63$

If $n = 8 \times n1 + n0$ $k = 8 \times k1 + k0$ where $n1, n0 = 0 \sim 7$ $k1, k0 = 0 \sim 7$ then, discrete Fourier transform equation (0) can be rewritten as follows.

$$Y(n1, n0) = \sum \sum_{k1,k0=0}^{7} y(k1, k0) \times W8^{**}(n0 \times k1)$$

$$\times W^{}(n0 \times k0) \times W8^{}(n1 \times k0)$$

where $W8 = exp(-2\pi j/8)$

Thus, decomposition into steps can be realized, $$Y1(n0,k0)=\Sigma y(k1,k0) \times W8^{**}(n0 \times k1) \quad (1)$$

$$k1=0\sim7$$

$$Y2(n0,k0)=Y1(n0,k0) \times W^{**}(n0 \times k0) \quad (2)$$

$$Y3(n0,n1)=\Sigma Y2(n0,k0) \times W8^{**}(n1 \times k0) \quad (3)$$

$$k0=0\sim7$$

The 8-point Fourier transform Y1 (n0, k0) (k0=0, 2, 4, 6) in the equation (1) is computed by the 8-point radix 2 pipeline FFT circuit 101A of the preceding stage in the ascending order of k0. On the other hand, the 8-point Fourier transform Y1 (n0, k0) (k0=1, 3, 5, 7) is computed by the 8-point radix 2 pipeline FFT circuit 101B of the preceding stage in the ascending order of k0.

Computation of the equation (2) is performed by the twiddle factor multiplication module 107. This multiplication module 107 includes a complex multiplication circuit 105 and a coefficient memory 106. The 8-point Fourier transform Y3 (n0, n1) (n0=0, 2, 4, 6) in the equation (3) is computed by the 8-point radix 2 pipeline FFT circuit 102A of the succeeding stage in the ascending order of n0. Similarly, the 8-point Fourier transform Y3 (n0, n1) (n0=1, 3, 5, 7) is computed by the 8-point radix 2 pipeline FFT circuit 102B of the succeeding stage in the ascending order of n0. The order in which the data undergone the data permutation are outputted as the transform proceeds will be described below.

At first, time-serial input data y(k) are inputted as four parallel input data. Only the values of the indexes are shown with the variable names y being omitted. Setting the parameters in the table 1 mentioned hereinbefore such that M=8, b=2 and B=8/4=2, then

TABLE 13

| First group | Second group | Third group | Fourth group | Fifth group | Sixth group | Seventh group | Eighth group |
|---|---|---|---|---|---|---|---|
| 0, 4 | 8, 12 | 16, 20 | 24, 28 | 32, 36 | 40, 44 | 48, 52 | 56, 60 |
| 1, 5 | 9, 13 | 17, 21 | 25, 29 | 33, 37 | 41, 45 | 49, 53 | 57, 61 |
| 2, 6 | 10, 14 | 18, 22 | 26, 30 | 34, 38 | 42, 46 | 50, 54 | 58, 62 |
| 3, 7 | 11, 15 | 19, 23 | 27, 31 | 35, 39 | 43, 47 | 51, 55 | 59, 63 |

The input data y(k) are rearranged or permutated as shown in the table 14 by the first half part 103a of the data permutating module 103 (see FIG. 16 for details) in accordance with the data permutation method 2 in the preceding stage. Setting the parameters in the table 2 mentioned hereinbefore such that M=8, a=2, A=8/2=4, then

TABLE 14

| First group | Second group | Third group | Fourth group |
|---|---|---|---|
| 0, 2, 4, 6, | 16, 18, 20, 22, | 32, 34, 36, 38, | 48, 50, 52, 54 |
| 1, 3, 5, 7, | 17, 19, 21, 23, | 33, 35, 37, 39, | 49, 51, 53, 55 |
| 8, 10, 12, 14, | 24, 26, 28, 30, | 40, 42, 44, 46, | 56, 58, 60, 62 |
| 9, 11, 13, 15, | 25, 27, 29, 31, | 41, 43, 45, 47, | 57, 59, 61, 63 |

Further, the input data y(k) is rearranged or permutated as shown in the table 15 by the second half part 103b of the data permutating module 103 (see FIG. 16 for details). At this junction, it should be mentioned that the read address generating circuits 103a-1 and 103b-1 correspond to those shown in FIGS. 6 and 7, respectively. However, in the read address generating circuit 103b-1 of the later half part shown in the figure, the intra-cluster column number counter is deleted, since the count number of the intra-cluster column number counter is one.

TABLE 15

| First group | Second group | Third group | Fourth group |
|---|---|---|---|
| 0, 16, 32, 48, | 2, 18, 34, 50, | 4, 20, 36, 52, | 6, 22, 38, 54 |
| 8, 24, 40, 56, | 10, 26, 42, 58, | 12, 28, 44, 60, | 14, 30, 46, 62 |

(The above are two parallel inputs to the 8-point radix 2 pipeline FFT circuit 101A of the preceding stage)

| | | | | | | | | | | | | | | | |
|---|---|---|---|---|---|---|---|---|---|---|---|---|---|---|---|
| 1, | 17, | 33, | 49, | 3, | 19, | 35, | 51, | 5, | 21, | 37, | 53, | 7, | 23, | 39, | 55 |
| 9, | 25, | 41, | 57, | 11, | 27, | 43, | 59, | 13, | 29, | 45, | 61, | 15, | 31, | 47, | 63 |

(The above are two parallel inputs to the 8-point radix 2 pipeline FFT circuit 101B of the preceding stage)

The sequence of the two parallel output data Y1(8n0+k0) from the 8-point radix 2 pipeline FFT circuit 101A of the preceding stage is shown below (only the values of the index 8n0+k0 of Y1 are shown)

| | | | | | | | | | | | | | | | |
|---|---|---|---|---|---|---|---|---|---|---|---|---|---|---|---|
| 0, 16, | 32, | 48, | 2, | 18, | 34, | 50, | 4, | 20, | 36, | 52, | 6, | 22, | 38, | 54 |
| 8, 24, | 40, | 56, | 10, | 26, | 42, | 58, | 12, | 28, | 44, | 60, | 14, | 30, | 46, | 62 |

The sequence of the two parallel output data Y1(8n0+k0) from the 8-point radix 2 pipeline FFT circuit 101B of the preceding stage is shown below (only the values of the indexes 8n0+k0 of Y1 are shown)

| | | | | | | | | | | | | | | | |
|---|---|---|---|---|---|---|---|---|---|---|---|---|---|---|---|
| 1, | 17, | 33, | 49, | 3, | 19, | 35, | 51, | 5, | 21, | 37, | 53, | 7, | 23, | 39, | 55 |
| 9, | 25, | 41, | 57, | 11, | 27, | 43, | 59, | 13, | 29, | 45, | 61, | 15, | 31, | 47, | 63, |

Figure 17:
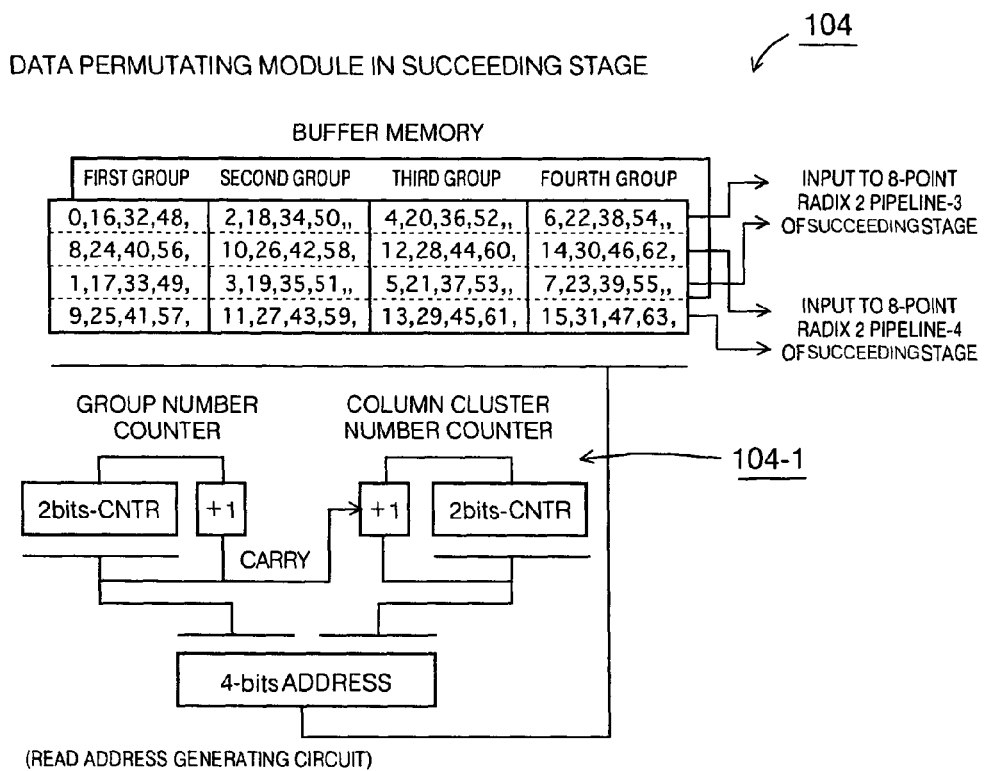
FIG. 17 is a block diagram showing a data permutating module in the succeeding stage of the 64-point FFT.

For the data of Y1 obtained in this way, data permutation is required for the transform for obtaining Y3. In the data permutating module 104 (see FIG. 17 for details), the sequence of the data Y(k) is such as shown in the undermentioned table 16. Incidentally, the read address generating circuit 104-1 shown in the figure corresponds to the read address circuit shown in FIG. 7. However, in FIG. 17, the intra-cluster column number counter is omitted from illustration, because the count number of the intra-cluster column number counter is one.

TABLE 16

| First group | Second group | Third group | Fourth group |
|---|---|---|---|
| 0, 2, 4, 6, | 16, 18, 20, 22, | 32, 34, 36, 38, | 48, 50, 52, 54 |
| 1, 3, 5, 7, | 17, 19, 21, 23, | 33, 35, 37, 39, | 49, 51, 53, 55 |

(The above are two parallel inputs to the 8-point radix 2 pipeline FFT circuit 102A of the succeeding stage)

| | | | | | | | | | | | | | | | |
|---|---|---|---|---|---|---|---|---|---|---|---|---|---|---|---|
| 8, | 10, | 12, | 14, | 24, | 26, | 28, | 30, | 40, | 42, | 44, | 46, | 56, | 58, | 60, | 62 |
| 9, | 11, | 13, | 15, | 25, | 27, | 29, | 31, | 41, | 43, | 45, | 47, | 57, | 59, | 61, | 63 |

(The above are two parallel inputs to the 8-point radix 2 pipeline FFT circuit 102B of the succeeding stage)

These data are inputted to the 8-point radix 2 pipeline FFT circuits 102A and 102B after having multiplied by the twiddle factors by means of four twiddle factor multiplication circuit, respectively, whereby the data of Y3 are obtained in this order in two parallel strings.

Incidentally, in the following table 17, only the exponent values of the coefficients multiplied in the coefficient multiplication circuit 105 are shown, assuming that the parameters in the table 6 are such that M=8, a=2, A=M/a=8/2=4.

TABLE 17

| Exponents of coefficient | | | |
|---|---|---|---|
| First group | Second group | Third group | Fourth group |
| 0, 0, 0, 0 | 0, 4, 8, 12 | 0, 2, 4, 6 | 0, 6, 12, 18 |
| 0, 0, 0, 0 | 2, 6, 10, 14 | 1, 3, 5, 7 | 3, 9, 15, 21 |

(The above are exponents of the coefficients for the data inputted to the 8-point radix 2 pipeline FFT circuit 102A of the succeeding stage)

| | | | |
|---|---|---|---|
| 0, 8, 16, 24 | 0, 12, 24, 36 | 0, 10, 20, 30 | 0, 14, 28, 42 |
| 4, 12, 20, 28 | 6, 18, 30, 42 | 5, 15, 25, 35 | 7, 21, 35, 49 |

(The above are exponents of the coefficients for the data inputted to the 8-point radix 2 pipeline FFT circuit 102B of the succeeding stage)

As is apparent from the foregoing description, in the Fourier transform apparatus constituted by the preceding stage and the succeeding stage according to the present invention, each stage includes M (power of 2)-point radix 2 pipeline FFT circuits each having two-parallel inputs/outputs in a number of a (divisor of M) for which the numbers of transform points are equal and the data permutating means for data supply to the transform means in each stage. By virtue of such arrangement, the pipeline width of the apparatus can be made to be independent of the transform point numbers of the individual pipeline FFT circuits in each stage.

The invention claimed is:

1. A Fourier transform apparatus for performing discrete Fourier transform, characterized in the said Fourier transform apparatus comprises transform means of a preceding stage including a number a of M-point radix 2 pipeline FFT circuits each having two parallel inputs/outputs, wherein M ($=2^m$, m>=2) represents a maximum number of points for transform and a, which is not less than two and is equal to or smaller than M/2, represents a divisor of said maximum transform point number M, first data supply means for supplying data sets each consisting of M data mutually separated by M points, on an a-by-a basis, in parallel on a two-by-two data basis in each set to said transform means of a preceding stage from input data, transform means of a succeeding stage including a same number of M-point radix 2 pipeline FFT circuits as the transform means of said preceding stage, each of said FFT circuits having two parallel inputs/outputs, second data supply means for supplying data sets, each consisting of M data mutually separated by M points, on an a-by-a basis, in parallel on a two-by-two data basis in each set to said transform means of a succeeding stage, from said transforming result of transform means of a preceding stage and twiddle factor multiplication means including 2a complex multiplication circuits and a factory memory for supplying twiddle factors, provided between said second data supply means and the transform means of said succeeding stage for multiplication of twiddle factors.

2. A Fourier transform apparatus set forth in claim 1, with respect to time series input data, characterized in that said first data supply means includes a first memory circuit including two buffer memories each having a two-bank structure, writing means for writing alternately and sequentially said input data on an M-by-M basis while changing over banks of one of said buffer memories of said first memory circuit, and reading means for reading out simultaneously a number a pieces of continuous data as a unit at every M-piece interval from corresponding positions of the two banks of the other one of said buffer memories of said first memory circuit for supplying said data in parallel on a 2a-by-2a data basis to the transform means of said preceding stage.

3. A Fourier transform apparatus set forth in claim 1, characterized in that said first data supply means is comprised of first and second data permutating modules in two stages for permutating the data in a predetermined order, said first and second data permutating modules being composed of second and third memory circuits for storing data, a read or write address generating circuit conforming to predetermined logics of said second and third memory circuits, respectively, and corner turners for permutating data read out from said second and third memory circuits, respectively, and that said second data supply means is comprised of third data permutating module, said third data permutating module being composed of a fourth memory circuit for storing data, a read or write address generating circuit conforming to a predetermined logic of said fourth memory circuit and corner turners for permutating data read out from said fourth memory circuit.

4. A Fourier transform unit characterized in that the Fourier transform apparatus set forth in claim 3 is disposed in parallel in a number equal to a power of "2", time-serial input data are allocated to said Fourier transform apparatuses, respectively, on an N-by-N basis, where N (=M×M) represents a maximum number of points for Fourier transform, and that said Fourier transform unit includes data distributing/permutating means for supplying sets of contiguous M point data on an a-by-a basis in parallel on a two-by-two data basis in each set to said Fourier transform apparatuses, respectively.

5. A Fourier transform unit set forth in claim 4, characterized in that said data distributing/permutating means is composed of a fifth memory circuit storing a number of data that corresponds to the product of the maximum number of points fro Fourier transform N and the number of Fourier transform apparatuses disposed in parallel, a read or write address generating circuit which conforms to a predetermined logic of said fifth memory circuit and corner turners for permutating data read out from said fifth memory circuit to output the data in parallel to said Fourier transform apparatuses, respectively, which are disposed in parallel.

6. A Fourier transform apparatus set forth in claim 3, characterized in that in the case where the number a of said pipeline FFT circuits incorporated in the transform means of said preceding stage and said succeeding stage is two, said first data supply means is comprised of fourth and fifth data permutating modules in two stages, said fourth and fifth data permutating modules being composed of fifth and sixth memory circuits for storing data, respectively, read or write address generating circuits conforming to predetermined logics of said fifth and sixth memory circuits, respectively, and corner turners for permutating data read out from said fifth memory circuit, and that said second data supply means is comprised of a sixth data permutating module, said sixth data permutating module being composed of a seventh memory circuit for storing data, a read or write address generating circuit conforming to a predetermined logic of said seventh memory circuit.

7. A Fourier transform unit characterized in that the Fourier transform apparatus defined in claim 6 is disposed in parallel in a number equal to a power of "2", time-serial input data are allocated to Fourier transform apparatuses, respectively, on an N-by-N basis, where N (=M×M) represents a maximum number of points for Fourier transform and that said Fourier transform unit includes data distributing/permutating means for supplying sets of contiguous M point data on an a-by-a basis in parallel on a two-by-two data basis in each set, and hence, in 2a parallel columns in total to said Fourier transform apparatuses, respectively.

8. A Fourier transform apparatus for performing discrete Fourier transform, comprising:

transform means of a preceding stage including a number a of M-point radix 2 pipeline FFT circuits each having two parallel inputs/outputs, wherein M ($=2^m$, m>=2) represents a maximum number of points for transform and a (a is equal to or smaller than M/2) represents a divisor of said maximum transform point number M;

first data supply means for supplying data sets each consisting of M data mutually separated by M points, on an a-by-a basis, in parallel on a two-by-two data basis in each set to said transform means of a preceding stage from input data;

transform means of a succeeding stage including a same number of M-point radix 2 pipeline FFT circuits as the transform means of said preceding stage, each of said FFT circuits having two parallel inputs/outputs;

second data supply means for supplying data sets, each consisting of M data mutually separated by M points, on an a-by-a basis, in parallel on a two-by-two data basis in each set to said transform means of a succeeding stage, from said transforming result of transform means of a preceding stage; and twiddle factor multiplication means including 2a complex multiplication circuits and a factory memory for supplying twiddle factors, provided between said second data supply means and the transform means of said succeeding stage for multiplication of twiddle factors, wherein said first data supply means is comprised of first and second data permutating modules, said first data permutating module being composed of a first memory circuit for storing data, a read or write address generating circuit which conforms to a predetermined logic of said first memory circuit and a parallel-in serial-out circuit for permutating the data read out from said first memory circuit, while said second data permutating module includes a second memory circuit constituted by two banks so that upon data storing, data are written in said two banks alternately M by M data whereas upon data reading, corresponding data of corresponding data sets each of M point data are simultaneously read out from said two banks, respectively, to constitute two parallel inputs of said pipeline FFT circuit and a read or write address generating circuit which operates in conformance to a predetermined logic of said second memory circuit, and said second data supply means is comprised of a third memory circuit constituted by two banks so that upon data storing, data are written in said two banks alternately on an M-by-M basis whereas upon data reading, corresponding data of corresponding data sets each of M point data are simultaneously read out from said two banks, respectively, to constitute two parallel inputs of said pipeline FFT circuit and a read or write address generating circuit which operates in conformance to a predetermined logic of said third memory circuit.

9. A Fourier transform unit characterized in that the Fourier transform apparatus defined in claim 8 is disposed in parallel in a number equal to a power of "2", time-serial input data are allocated to Fourier transform apparatuses, respectively, on an N-by-N basis, where N (=M×M) represents a maximum number of points for Fourier transform and that said Fourier transform unit includes data distributing/permutating means for supplying sets of contiguous M point data on an a-by-a basis in parallel on a two-by-two data basis in each set, and hence, in 2a parallel columns in total to said Fourier transform apparatuses, respectively.

* * * * *

UNITED STATES PATENT AND TRADEMARK OFFICE
CERTIFICATE OF CORRECTION

PATENT NO. : 7,461,114 B2 Page 1 of 1
APPLICATION NO. : 10/645498
DATED : December 2, 2008
INVENTOR(S) : Toshiro Nakazuru et al.

It is certified that error appears in the above-identified patent and that said Letters Patent is hereby corrected as shown below:

Column 34, Line 49, change "fro" to --for--.

Signed and Sealed this

Tenth Day of March, 2009

JOHN DOLL
*Acting Director of the United States Patent and Trademark Office*